(12) United States Patent
Yamaguchi et al.

(10) Patent No.: US 9,880,679 B2
(45) Date of Patent: Jan. 30, 2018

(54) ELECTRONIC APPARATUS WHICH EFFECTS TOUCH COORDINATE BASED ON PROXIMITY AND STRAIN

(71) Applicant: PANASONIC INTELLECTUAL PROPERTY MANAGEMENT CO., LTD., Osaka (JP)

(72) Inventors: Takeshi Yamaguchi, Kanagawa (JP); Tomoki Takano, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 181 days.

(21) Appl. No.: 14/643,300

(22) Filed: Mar. 10, 2015

(65) Prior Publication Data
US 2015/0371608 A1    Dec. 24, 2015

(30) Foreign Application Priority Data

Jun. 20, 2014  (JP) .................................. 2014-126896
Jul. 2, 2014   (JP) .................................. 2014-136528

(51) Int. Cl.
*G06F 3/044*     (2006.01)
*G06F 3/041*     (2006.01)

(52) U.S. Cl.
CPC ............ *G06F 3/044* (2013.01); *G06F 3/0418* (2013.01); *G06F 2203/04101* (2013.01)

(58) Field of Classification Search
CPC .................. G06F 3/044; G06F 3/0418; G06F 2203/04101; G06F 1/1652;

(Continued)

(56) References Cited

U.S. PATENT DOCUMENTS

| 6,492,979 B1 * | 12/2002 | Kent | ...................... | G06F 3/0414 |
|---|---|---|---|---|
| | | | | 178/18.01 |
| 7,061,475 B2 * | 6/2006 | Kent | ...................... | G06F 3/0418 |
| | | | | 178/18.01 |

(Continued)

FOREIGN PATENT DOCUMENTS

| EP | 2804088 | 11/2014 |
|---|---|---|
| JP | 6-044254 | 2/1994 |

(Continued)

OTHER PUBLICATIONS

U.S. Appl. No. 14/643,251 to Takeshi Yamaguchi et al., filed Mar. 10, 2015.

(Continued)

*Primary Examiner* — Temesghen Ghebretinsae
*Assistant Examiner* — Ivelisse Martinez Quiles
(74) *Attorney, Agent, or Firm* — Greenblum & Bernstein, P.L.C.

(57) ABSTRACT

An electronic apparatus includes a display unit that displays predetermined information and an electrostatic capacitive touch panel unit through which display of the display unit passes and that determines a two-dimensional coordinate indicated by an instructing object which has some conductivity. In the electronic apparatus, when a predetermined condition is satisfied, a two-dimensional coordinate corresponding to the instructing object is caused to be effective and the effective two-dimensional coordinate is changed depending on movement of the instructing object, and when the effective two-dimensional coordinate is changed in a predetermined range for a predetermined time, the effective two-dimensional coordinate is caused to be ineffective.

12 Claims, 21 Drawing Sheets

(58) Field of Classification Search
CPC ........... G06F 2203/04102; G06F 3/041; G06F 3/0412; G06F 3/0414
See application file for complete search history.

(56) References Cited

U.S. PATENT DOCUMENTS

| | | |
|---|---|---|
| 2006/0244733 A1 | 11/2006 | Geaghan |
| 2006/0279548 A1 | 12/2006 | Geaghan |
| 2007/0080953 A1 | 4/2007 | Lii |
| 2008/0062151 A1 | 3/2008 | Kent |
| 2009/0065267 A1 | 3/2009 | Sato |
| 2011/0050629 A1 | 3/2011 | Homma et al. |
| 2011/0175845 A1 | 7/2011 | Honda et al. |
| 2011/0248948 A1 | 10/2011 | Griffin et al. |
| 2012/0023459 A1 | 1/2012 | Westerman |
| 2012/0044172 A1 | 2/2012 | Ohki et al. |
| 2012/0056848 A1 | 3/2012 | Yamano et al. |
| 2012/0079039 A1 | 3/2012 | Imai |
| 2012/0105481 A1 | 5/2012 | Baek et al. |
| 2012/0194446 A1 | 8/2012 | Lin et al. |
| 2013/0172052 A1 | 7/2013 | Bengtsson et al. |
| 2013/0201160 A1 | 8/2013 | Ito et al. |
| 2013/0285956 A1 | 10/2013 | Kamii et al. |
| 2014/0028575 A1 | 1/2014 | Parivar et al. |
| 2014/0176458 A1 | 6/2014 | Matsuda |
| 2014/0184551 A1* | 7/2014 | Igarashi ............... G06F 3/041 345/173 |
| 2014/0204059 A1 | 7/2014 | Geaghan |
| 2014/0292726 A1* | 10/2014 | Nakano ............... G06F 3/0488 345/178 |
| 2014/0340338 A1 | 11/2014 | Kim et al. |
| 2015/0042603 A1* | 2/2015 | Takano ............... G06F 3/0414 345/174 |
| 2015/0042610 A1* | 2/2015 | Takano ............... G06F 3/044 345/174 |
| 2015/0109218 A1 | 4/2015 | Satou |
| 2015/0277661 A1 | 10/2015 | Morinaga et al. |
| 2015/0301684 A1* | 10/2015 | Shimamura ........... G06F 3/0418 345/174 |
| 2015/0331517 A1 | 11/2015 | Filiz et al. |
| 2015/0338983 A1* | 11/2015 | Benbasat ............... G06F 3/044 345/174 |
| 2015/0370385 A1 | 12/2015 | Yamaguchi et al. |
| 2015/0370386 A1 | 12/2015 | Yamaguchi et al. |
| 2015/0370387 A1 | 12/2015 | Yamaguchi et al. |

FOREIGN PATENT DOCUMENTS

| | | |
|---|---|---|
| JP | 2004-534974 | 11/2004 |
| JP | 2006-323457 | 11/2006 |
| JP | 2009-087311 | 4/2009 |
| JP | 2009-181232 | 8/2009 |
| JP | 2010-108255 | 5/2010 |
| JP | 2010-108490 | 5/2010 |
| JP | 2011-053971 | 3/2011 |
| JP | 2011-154431 | 8/2011 |
| JP | 2012-043267 | 3/2012 |
| JP | 2012-069002 | 4/2012 |
| JP | 2012-084049 | 4/2012 |
| JP | 2012-138026 | 7/2012 |
| JP | 2012-141650 | 7/2012 |
| JP | 2012-160176 | 8/2012 |
| JP | 2013-022986 | 2/2013 |
| JP | 2013-117900 | 6/2013 |
| JP | 2013-156888 | 8/2013 |
| JP | 2013-161221 | 8/2013 |
| JP | 2013-222283 | 10/2013 |
| JP | 2014-078116 | 5/2014 |
| JP | 2014-081666 | 5/2014 |
| JP | 2014-109883 | 6/2014 |
| JP | 5519871 | 6/2014 |
| JP | 5519871 B | 6/2014 |
| JP | 2014-123288 | 7/2014 |
| WO | 2002/035460 | 5/2002 |
| WO | 2002/035461 | 5/2002 |
| WO | 2006/133018 | 12/2006 |
| WO | 2010/122825 | 10/2010 |
| WO | 2014/098946 | 6/2014 |

OTHER PUBLICATIONS

U.S. Appl. No. 14/643,201 to Takeshi Yamaguchi et al., filed Mar. 10, 2015.
U.S. Appl. No. 14/643,344 to Takeshi Yamaguchi et al., filed Mar. 10, 2015.
U.K. Search Report dated Aug. 17, 2015 for U.K. Patent Application No. GB1503429.1.
British Search Report dated Aug. 17, 2015 for British Patent Application No. GB1503428.3.
British Search Report dated Aug. 17, 2015 for British Patent Application No. GB1503429.1.
British Search Report dated Aug. 17, 2015 for British Patent Application No. GB1503430.9.
British Search Report dated Aug. 17, 2015 for British Patent Application No. GB1503431.7.
Office Action issued in U.S. Appl. No. 14/643,251, dated May 19, 2016.
Office Action issued in U.S. Appl. No. 14/643,201, dated May 17, 2016.

* cited by examiner

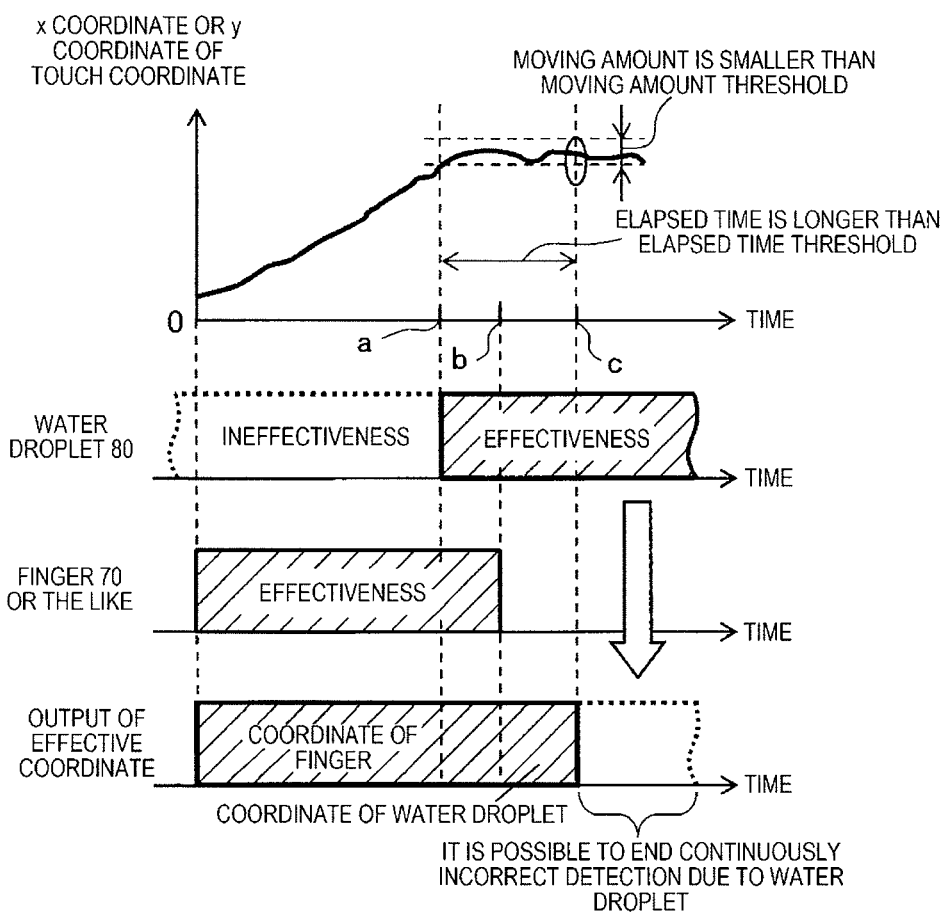

FIG. 16

$$(\text{MOVING AMOUNT}) = \sqrt{\{(\text{PREVIOUS COORDINATE } x) - (\text{TOUCH COORDINATE } x)\}^2 + \{(\text{PREVIOUS COORDINATE } y) - (\text{TOUCH COORDINATE } y)\}^2}$$

ELECTRONIC APPARATUS WHICH EFFECTS TOUCH COORDINATE BASED ON PROXIMITY AND STRAIN

CROSS REFERENCE TO RELATED APPLICATIONS

This application claims priority to Japanese Patent Application No. 2014-126896 filed Jun. 20, 2014 and Japanese Patent Application No. 2014-136528 filed Jul. 2, 2014, the entire contents of which are incorporated by reference herein.

BACKGROUND OF THE INVENTION

1. Field of the Invention

The present invention relates to an electronic apparatus which includes a touch panel, a control method of the electronic apparatus, a program which is installed on the electronic apparatus to allow the control method to be performed, and a server which stores the program so as to be downloadable.

2. Description of the Related Art

Electronic apparatuses such as smartphones and tablets, in which a touch panel is mounted, have come into wide use. Such an electronic apparatus may include an electrostatic capacitive touch panel. The electrostatic capacitive touch panel can receive a "touch operation" performed by directly bringing a finger of a bare hand onto contact with the surface of the touch panel and "hover operation" performed by causing a finger to be positioned at a predetermined height above the surface of the touch panel, without bringing the finger of the bare hand onto contact with the surface of the touch panel. Accordingly, a user can perform an operation with a gloved finger in addition to a bare hand.

As the related art relating to such an electrostatic capacitive touch panel, there is an information processing apparatus disclosed in Japanese Patent Unexamined Publication No. 2011-53971, for example. Japanese Patent Unexamined Publication No. 2011-53971 discloses that an approaching amount to a touch panel and a pressure value applied to the touch panel are detected and a touch operation and a hover operation are distinguished from each other based on whether or not the detected amount and value satisfy predetermined conditions.

As another related art relating to an electrostatic capacitive touch panel, there is a touch switch disclosed in Japanese Patent Unexamined Publication No. 2009-181232, for example. Japanese Patent Unexamined Publication No. 2009-181232 discloses that if a detection value in a touch panel exceeds a first threshold, it is determined that "a touch operation is performed" and if a state where the detection value in the touch panel is equal to or less than the first threshold and exceeds a second threshold is maintained for a predetermined time or more, it is determined that "a hover operation is performed". In an electrostatic capacitive touch panel, a very small variation of a capacitive value is detected in order to detect a hover operation. However, a detected variation of the capacitive value when a water droplet (example of a conductor) is attached to a touch panel is approximate to a detected variation of the capacitive value when a hover operation is actually performed on the touch panel. Thus, the attachment may be incorrectly detected as performing of the hover operation when a water droplet is attached to the touch panel due to rain and the like.

SUMMARY OF THE INVENTION

An electronic apparatus according to the present invention includes a display unit that displays predetermined information and an electrostatic capacitive touch panel unit through which display of the display unit passes and that determines a two-dimensional coordinate indicated by an instructing object which has some conductivity. When a predetermined condition is satisfied, the two-dimensional coordinate corresponding to the instructing object is caused to be effective and the effective two-dimensional coordinate is changed depending on movement of the instructing object. The effective two-dimensional coordinate is caused to be ineffective when the effective two-dimensional coordinate is changed in a predetermined range for a predetermined time.

The instructing object such as a finger is caused to approach the touch panel, a two-dimensional coordinate is caused to be effective, and then the two-dimensional coordinate is changed depending on movement of the instructing object. The two-dimensional coordinate is changed to be in a location of the touch panel, where there is a water droplet and then when the instructing object is separated from the touch panel, it is difficult to distinguish the water droplet remaining on the touch panel and the separated instructing object. Thus, a two-dimensional coordinate corresponding to the remaining water droplet may be held to be effective and the subsequent desired operation may not be performed. With the configuration, when an effective two-dimensional coordinate is not greatly changed for a predetermined time, that is, when it is highly likely that the effective two-dimensional coordinate is a two-dimensional coordinate corresponding to the remaining water droplet, the two-dimensional coordinate is caused to be ineffective and thus the subsequent desired operation or the like is allowed to be performed.

In the electronic apparatus according to the present invention, the effective two-dimensional coordinate may be allowed to be displayed in the display unit.

In the electronic apparatus according to the present invention, the predetermined time may be set as a first period, the predetermined range may be set as a first range, and when the effective two-dimensional coordinate is changed in a second range for a second period, a predetermined operation may be performed, and the first period may be longer than the second period.

Since the first period for being ineffective is longer than the second period corresponding to a predetermined operation (for example, an operation corresponding to long pressing), it is possible to perform a predetermined operation as necessary. When the effective two-dimensional coordinate is not greatly changed for the predetermined time, that is, when it is highly likely that the effective two-dimensional coordinate is a two-dimensional coordinate corresponding to the remaining water droplet, the two-dimensional coordinate is caused to be ineffective and thus the subsequent desired operation or the like is allowed to be performed.

In the electronic apparatus according to the present invention, a two-dimensional coordinate corresponding to the instructing object may be caused to be effective and the effective two-dimensional coordinate may be changed depending on movement of the instructing object when a distance between the instructing object and the touch panel unit is equal to or less than a predetermined distance, and the effective two-dimensional coordinate may be caused to be ineffective when the effective two-dimensional coordinate is changed in a predetermined range for a predetermined time.

In the electronic apparatus according to the present invention, the predetermined distance may be set to 0 (zero). The predetermined distance being 0 includes a case where the instructing object such as a finger is brought into contact with the touch panel and the finger is distorted.

The electronic apparatus according to the present invention may further include a casing, a transparent member that is disposed to be stacked on the touch panel unit and through which display of the display unit passes, and a pressure detection unit that detects distortion of the transparent member. The display unit may be disposed in the casing. When the distortion detected by the pressure detection unit satisfies a predetermined condition, a two-dimensional coordinate corresponding to the instructing object may be caused to be effective and the effective two-dimensional coordinate may be changed depending on movement of the instructing object. When the effective two-dimensional coordinate is changed in the predetermined range for the predetermined time, the effective two-dimensional coordinate may be caused to be ineffective.

In the electronic apparatus according to the present invention, when the distortion detected by the pressure detection unit is larger than at least a predetermined value, a two-dimensional coordinate corresponding to the instructing object may be caused to be effective, the effective two-dimensional coordinate may be changed depending on movement of the instructing object, and when the effective two-dimensional coordinate is changed in the predetermined range for the predetermined time, the effective two-dimensional coordinate may be caused to be ineffective.

In the electronic apparatus according to the present invention, the pressure detection unit may detect distortion of the transparent member by using a piezoelectric element.

In the electronic apparatus according to the present invention, the pressure detection unit may detect distortion of the transparent member by using a piezoelectric film.

In the electronic apparatus according to the present invention, the piezoelectric film may be disposed on a surface of the display unit opposite to the touch panel unit.

A control method according to the present invention is allowed to be used in an electronic apparatus including a display unit that displays predetermined information and an electrostatic capacitive touch panel unit through which display of the display unit passes and that determines a two-dimensional coordinate indicated by an instructing object which has some conductivity. The control method includes causing a two-dimensional coordinate corresponding to the instructing object to be effective when a predetermined condition is satisfied, causing the effective two-dimensional coordinate to be changed depending on movement of the instructing object, and causing the effective two-dimensional coordinate to be ineffective when the effective two-dimensional coordinate is changed in a predetermined range for a predetermined time.

With this configuration, the two-dimensional coordinate is caused to be ineffective and thus the subsequent desired operation or the like is allowed to be performed when the effective two-dimensional coordinate is not greatly changed for the predetermined time, that is, when it is highly likely that the effective two-dimensional coordinate is a two-dimensional coordinate corresponding to the remaining water droplet. The electronic apparatus according to the present invention includes a display unit that displays predetermined information and an electrostatic capacitive touch panel unit through which display of the display unit passes and that determines a two-dimensional coordinate indicated by an instructing object which has some conductivity. When a first condition is satisfied, at least the display unit is turned on, when a second condition is satisfied, a two-dimensional coordinate corresponding to the instructing object is caused to be effective, the effective two-dimensional coordinate is changed depending on movement of the instructing object, and when the effective two-dimensional coordinate is changed in a predetermined range for a predetermined time, the display unit is turned off.

Accordingly, when the effective two-dimensional coordinate is not greatly changed for the predetermined time, that is, when it is highly likely that the effective two-dimensional coordinate is a two-dimensional coordinate corresponding to the remaining water droplet, it is possible to suppress the display unit to be continuously turned on due to the remaining water droplet by turning the display unit off. Consequently, it is possible to extend the life of the battery when the electronic apparatus is operated by using a battery as a power source.

In the electronic apparatus according to the present invention, when the effective two-dimensional coordinate is changed in the predetermined range for the predetermined time, the effective two-dimensional coordinate may be caused to be ineffective and the display unit is turned off.

In the electronic apparatus according to the present invention, the first condition is the same as the second condition.

In the electronic apparatus according to the present invention, when the effective two-dimensional coordinate is changed in the predetermined range for a first period, the display unit is turned off after a third period elapses.

In the electronic apparatus according to the present invention, the third period is longer than at least the first period.

Accordingly, the display unit is suddenly turned off and thus it is possible to suppress a user of the electronic apparatus from feeling a sense of incompatibility.

In the electronic apparatus according to the present invention, turning off of the display unit corresponds to a state where brightness of the display unit is lower than the brightness of the display unit when the display unit is turned on.

A control method according to the present invention is allowed to be used in an electronic apparatus including a display unit that displays predetermined information and an electrostatic capacitive touch panel unit through which display of the display unit passes and that determines a two-dimensional coordinate indicated by an instructing object which has some conductivity. In the control method, when a first condition is satisfied, at least the display unit is turned on, when a second condition is satisfied, a two-dimensional coordinate corresponding to the instructing object is caused to be effective, the effective two-dimensional coordinate is changed depending on movement of the instructing object, and when the effective two-dimensional coordinate is changed in a predetermined range for a predetermined time, the display unit is turned off.

Accordingly, when the effective two-dimensional coordinate is not greatly changed for the predetermined time, that is, when it is highly likely that the effective two-dimensional coordinate is a two-dimensional coordinate corresponding to the remaining water droplet, it is possible to suppress the display unit to be continuously turned on due to the remaining water droplet by turning the display unit off. Consequently, it is possible to extend the life of the battery when the electronic apparatus is operated by using a battery as a power source.

A program according to the present invention is capable of performing the control method by being installed on an electronic apparatus.

A server according to the present invention which stores the program transmits the program in accordance with reception of payment information regarding the cost of the program.

According to the present invention, it is possible to suppress incorrect detection of an operation with a bare hand and gloves due to a water droplet in a state where a conductor such as a water droplet is attached to the touch panel and it is also possible to perform operations appropriately.

BRIEF DESCRIPTION OF DRAWINGS

FIG. 15 is a schematic diagram illustrating an operation example of contact, movement, and separation of a finger or the like in the electronic apparatus according to the first exemplary embodiment;

FIG. 16 is a diagram illustrating a calculation expression of a movement amount of the electronic apparatus in the first exemplary embodiment;

DETAILED DESCRIPTION OF THE PREFERRED EMBODIMENTS

First Exemplary Embodiment

Hereinafter, a first exemplary embodiment according to the present invention will be described with reference to the drawings.

Figure 1:
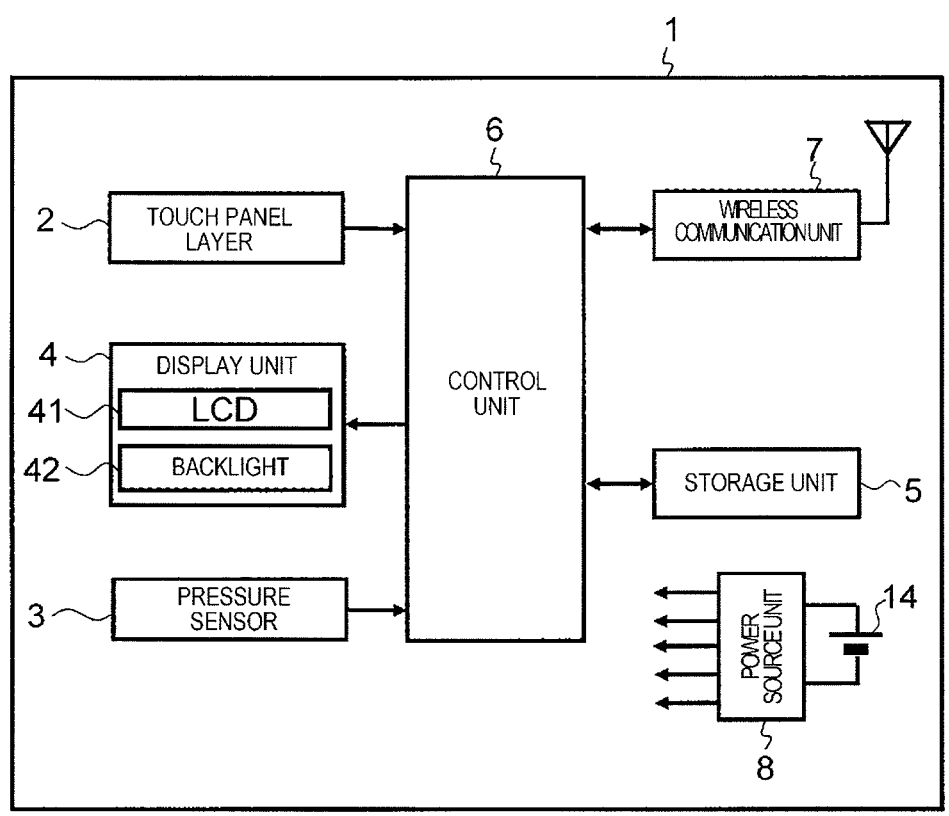
FIG. 1 is a block diagram illustrating an example of a schematic configuration of an electronic apparatus according to a first exemplary embodiment.

FIG. 1 is a block diagram illustrating an example of a schematic configuration of an electronic apparatus 1 according to the first exemplary embodiment.

In FIG. 1, the electronic apparatus 1 includes a touch panel layer 2, a pressure sensor 3, a display unit 4, a storage unit 5, a control unit 6, a wireless communication unit 7, and a power source unit 8. Examples of the electronic apparatus 1 include a smartphone and a tablet.

Figure 2:
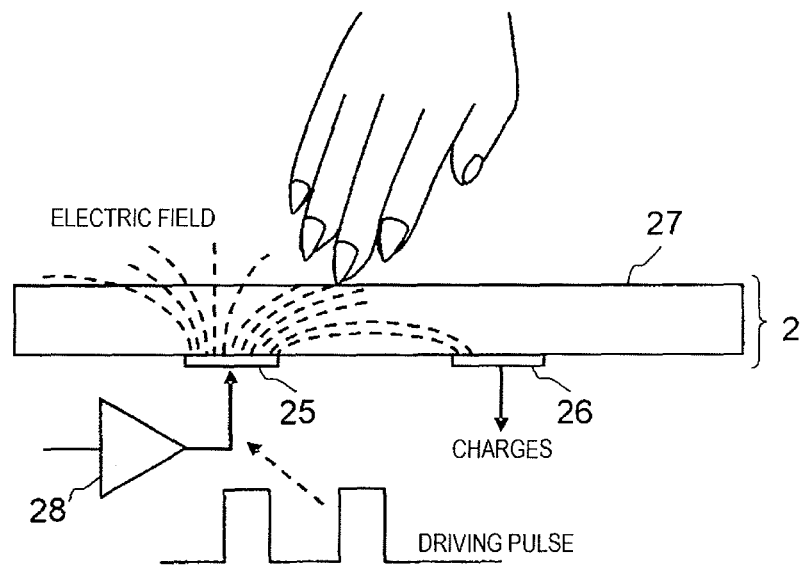
FIG. 2 is a diagram illustrating a schematic configuration of an electrostatic capacitive touch panel according to the first exemplary embodiment.

The touch panel layer 2 corresponds to an electrostatic capacitive touch panel layer and includes a transmission electrode 25 and a reception electrode 26 which are disposed on a lower surface of a dielectric plate 27 at a distance from each other, as illustrated in FIG. 2. A driving pulse based on a driving signal is applied to the transmission electrode 25 through an amplifier 28. An electric field is generated from the drive electrode 25 by applying the driving pulse to the transmission electrode 25. When a finger or the like having conductivity enters into the electric field, the number of lines of electric force between the transmission electrode 25 and the reception electrode 26 is reduced and a variation in the number appears as a variation in the charge in the reception electrode 26.

The touch panel layer 2 (example of a touch panel unit) sequentially outputs a two-dimensional coordinate (x, y) in the display unit 4, which is indicated by a finger or the like to the control unit 6 based on a sensing signal depending on a variation in charge in the reception electrode 26. That is, when the two-dimensional coordinate (x, y) is changed depending on movement of the finger or the like, the touch panel layer 2 sequentially outputs two-dimensional coordinates (x, y) corresponding to the same finger or the like. An operation described herein is performed in a control unit of a touch panel (not illustrated) included in the touch panel layer 2.

Figure 3:
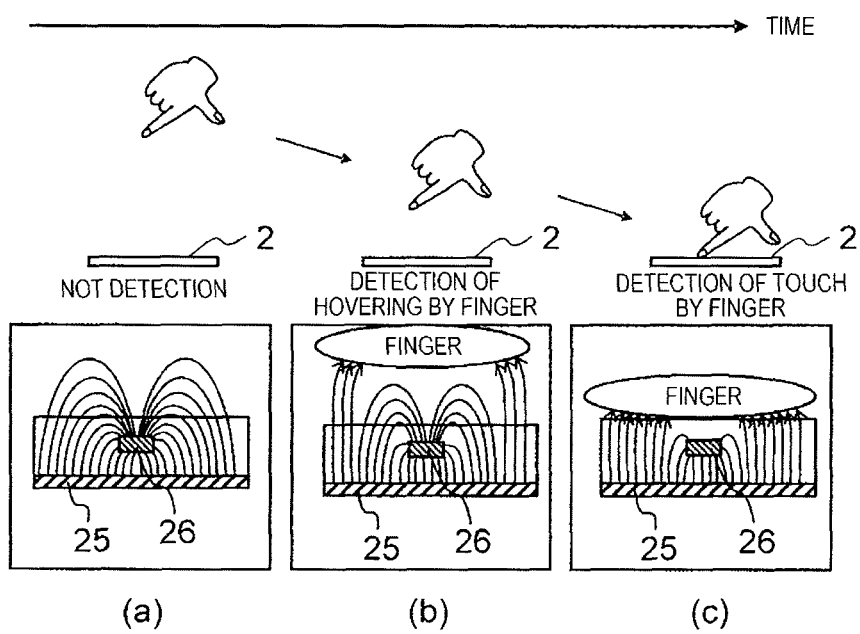
FIG. 3 is a diagram illustrating a detection state when a finger approaches a touch panel gradually according to the first exemplary embodiment.

FIG. 3 is a diagram illustrating a detection state when a finger gradually approaches a touch panel layer 2. FIG. 3(a) illustrates a state where a finger does not enter into an electric field, that is, a state where the finger is not detected. FIG. 3(b) illustrates a state where a finger is in an electric field, but does not come into contact with the touch panel layer 2, that is a state where a hover operation is detected. FIG. 3(c) illustrates a state where a finger is in an the electric field and comes into contact with the touch panel layer 2, that is, a state where the touch operation is detected. When an operation of a finger which is covered with gloves being brought into contact with the touch panel layer 2 is performed, the finger is not directly brought into contact with the touch panel layer 2 and thus the state in FIG. 3(b) occurs.

Figure 4:
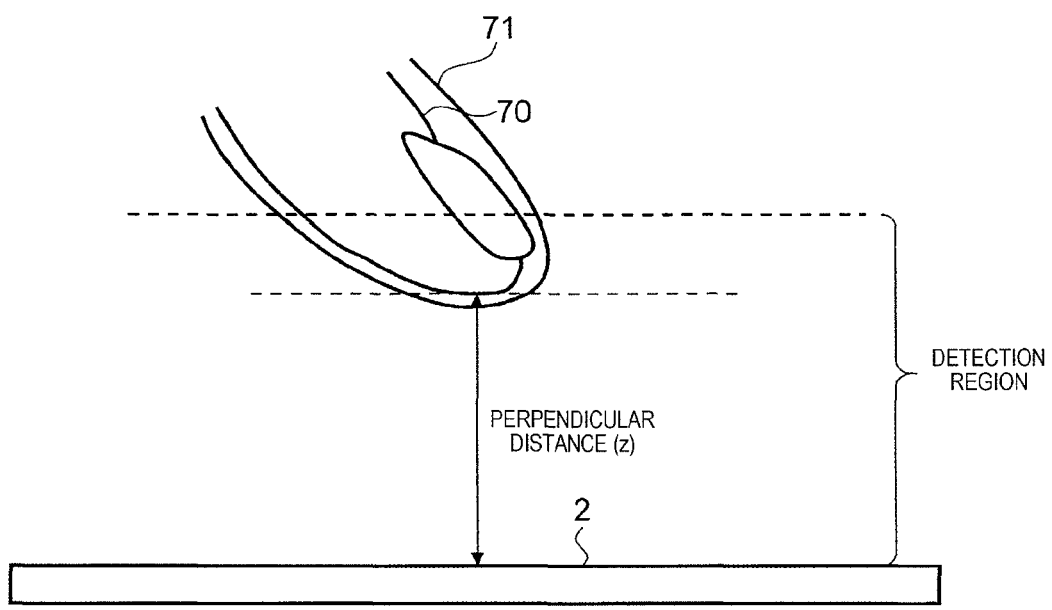
FIG. 4 is a diagram illustrating a detection region in the electronic apparatus according to the first exemplary embodiment.

FIG. 4 illustrates the state where the hover operation is detected which is illustrated in FIG. 3(b), in detail. A case where a perpendicular distance (z) between a finger 70 and the touch panel layer 2 is smaller than a predetermined distance corresponds to the state where the hover operation is detected. The predetermined distance varies depending on the direction or the size of the finger 70 or may be changed in accordance with design necessities. As described above, the finger 70 may also be detected in a state where the finger 70 is covered with gloves 71.

The touch panel layer 2 outputs a two-dimensional coordinate (x, corresponding to the finger 70 when the state (including a touch state of the perpendicular distance=0) where the hover operation is detected occurs by the finger 70. Then, as described above, the touch panel layer 2 continues to output a two-dimensional coordinate (x, y) sequentially and outputs a two-dimensional coordinate (x, y) until the finger 70 is separated from the touch panel layer 2 and the hover operation is not detected. The two-dimensional coordinate refers to a two-dimensional coordinate on a surface of the touch panel layer 2 having a surface shape.

Figure 5:
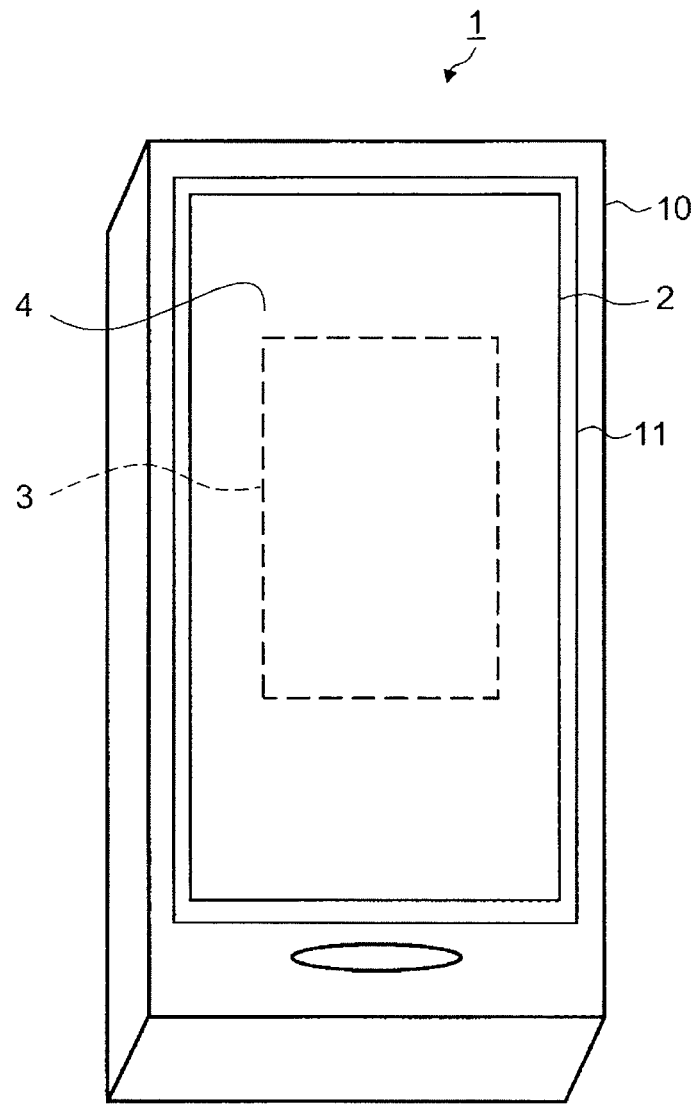
FIG. 5 is a perspective view illustrating an example of an appearance of a fore surface of the electronic apparatus according to the first exemplary embodiment.

The electronic apparatus 1 has a rectangular parallelepiped casing 10, as illustrated in FIG. 5. In FIG. 5, glass 11 which is a transparent member and the touch panel layer 2 are disposed on a fore surface (front surface) side of the casing 10. The glass 11 and the touch panel layer 2 are formed to have a rectangular shape in a plan view and each has an area smaller than the area of the fore surface of the casing 10. The glass 11 is stacked on the touch panel layer 2 so as to be disposed on a side ahead of the touch panel layer 2.

The display unit 4 which has a rectangular shape in a plan view is disposed on a back surface of a surface of the touch panel layer 2 on which the glass 11 is stacked.

The pressure sensor 3 (example of a pressure detection unit) detects distortion (predetermined distortion amount) of the glass 11 used for protecting the touch panel layer 2 and outputs a signal indicating the presence or absence of distortion to the control unit 6. Distortion of the glass is generated by the instructing object pressing the glass and is not generated by attachment of a water droplet or the like. The signal indicating presence or absence of the distortion is not necessarily required. The pressure sensor 3 may output a signal indicating either of that the distortion is present or that the distortion is absent. In addition, the pressure sensor 3 may output a signal indicating the extent of distortion of the glass to the control unit 6 and the control unit 6 may determine presence or absence of the distortion instead of having the pressure sensor 3 determine the presence or absence of the distortion for itself.

Figure 6:
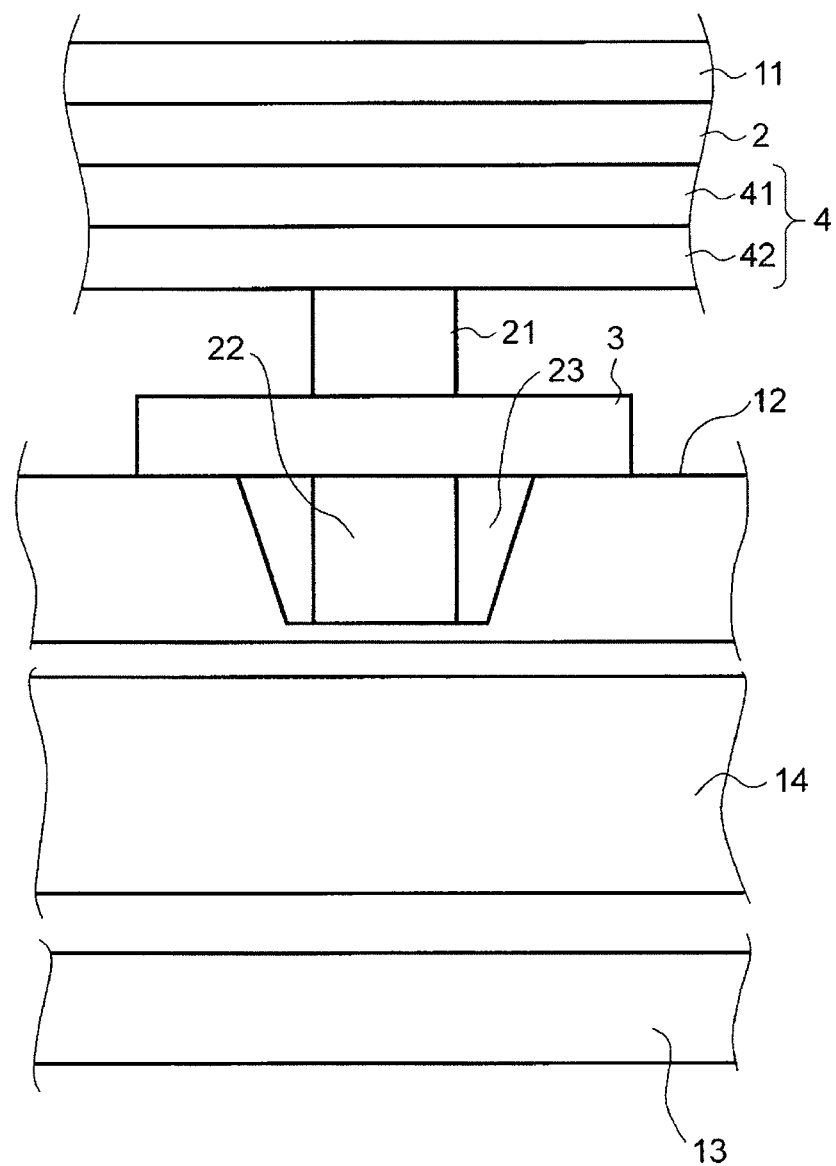
FIG. 6 is a diagram illustrating a first arrangement example of glass, a touch panel layer, a pressure sensor and a display unit in the electronic apparatus according to the first exemplary embodiment.

FIG. 6 is a side cross-sectional view of the electronic apparatus 1. As illustrated in FIG. 6, the touch panel layer 2, the display unit 4 (liquid crystal display (LCD) 41 and backlight 42), a presser (plunger) 21, the pressure sensor 3, and an elastic member 22 are disposed under the glass 11 in this order. That is, the pressure sensor 3 is disposed on a side opposite to the touch panel layer 2 based on the display unit 4.

In FIG. 6, the presser 21 is disposed between the backlight 42 and the pressure sensor 3. One end of the presser 21 comes into contact with a surface of the backlight 42 and another end of the presser 21 is fixed to a surface of the pressure sensor 3. A concave portion 23 is formed on a frame portion 12 (example of a portion of the casing 10) of the casing 10. The elastic member 22 is stood up on the concave portion 23. One end of the elastic member 22 is fixed to a bottom surface of the concave portion 23 and another end of the elastic member 22 is fixed to another surface (surface reverse to the surface to which the presser 21 is fixed) of the pressure sensor 3. Both ends of the pressure sensor 3 are fixed to the frame portion 12.

In FIG. 6, a rechargeable battery 14 is disposed under the frame portion 12. A lower surface portion 13 (example of a portion of the casing 10) of the casing 10 is disposed under the rechargeable battery 14. That is, the rechargeable battery 14 is disposed between the frame portion 12 and the lower surface portion 13.

In the configuration of FIG. 6, the presser 21 causes the pressure sensor 3 to be pushed down in a downward direction (direction of the concave portion 23) when contact of the finger 70 (bare hand or gloved hand) of a user causes pressure to be applied to the glass 11. At this time, the elastic member 22 contracts so as to absorb the pressure applied to the pressure sensor 3. The contracted elastic member 22 is changed back into the elastic member 22 having an original length when the finger of the user is separated from the glass 11 and no pressure is applied to the glass 11. Accordingly, the pressure sensor 3 is pushed up in an upward direction (direction of the backlight 42).

Figure 7A:
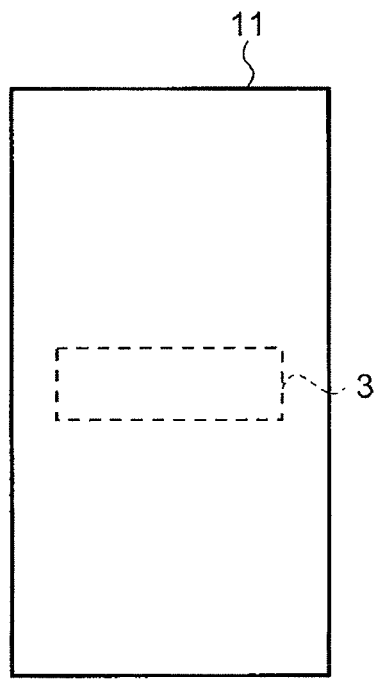
FIG. 7A is a diagram illustrating a first arrangement example of the pressure sensor in the electronic apparatus according to the first exemplary embodiment.
Figure 7B:
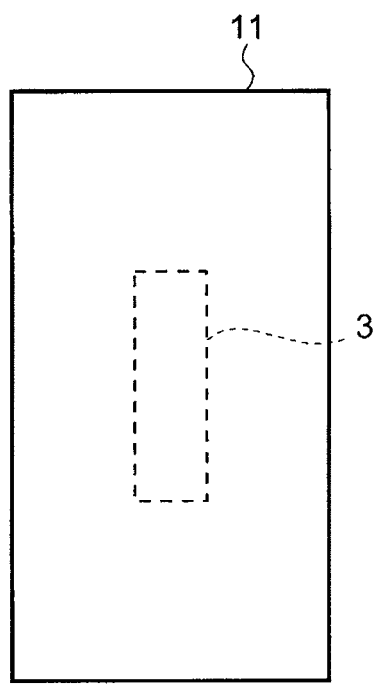
FIG. 7B is a diagram illustrating a second arrangement example of the pressure sensor in the electronic apparatus according to the first exemplary embodiment.
Figure 7C:
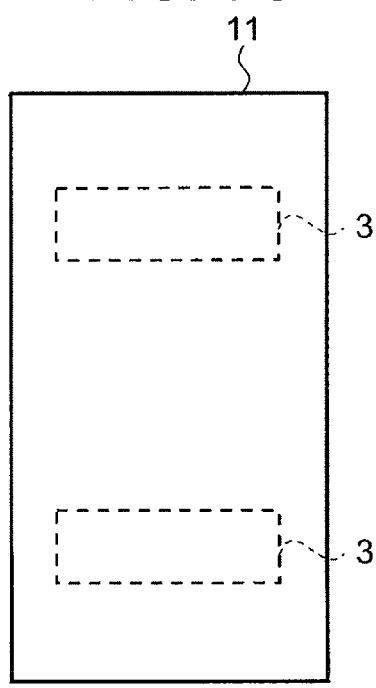
FIG. 7C is a diagram illustrating a third arrangement example of the pressure sensor in the electronic apparatus according to the first exemplary embodiment.

FIG. 7 illustrates examples of a placement position of the pressure sensor 3 illustrated in FIG. 6 in the electronic apparatus 1. Each of FIG. 7A, FIG. 7B, and FIG. 7C illustrates the placement position of the pressure sensor 3 on the fore surface (front surface) of the casing 10 in the electronic apparatus 1.

In FIG. 7C, two pressure sensors 3 are disposed, but these two pressure sensor 3 may function collectively as one pressure sensor 3.

The number of the pressure sensors 3 is not limited to one or two and three pressure sensors 3 or more may be disposed.

Figure 8:
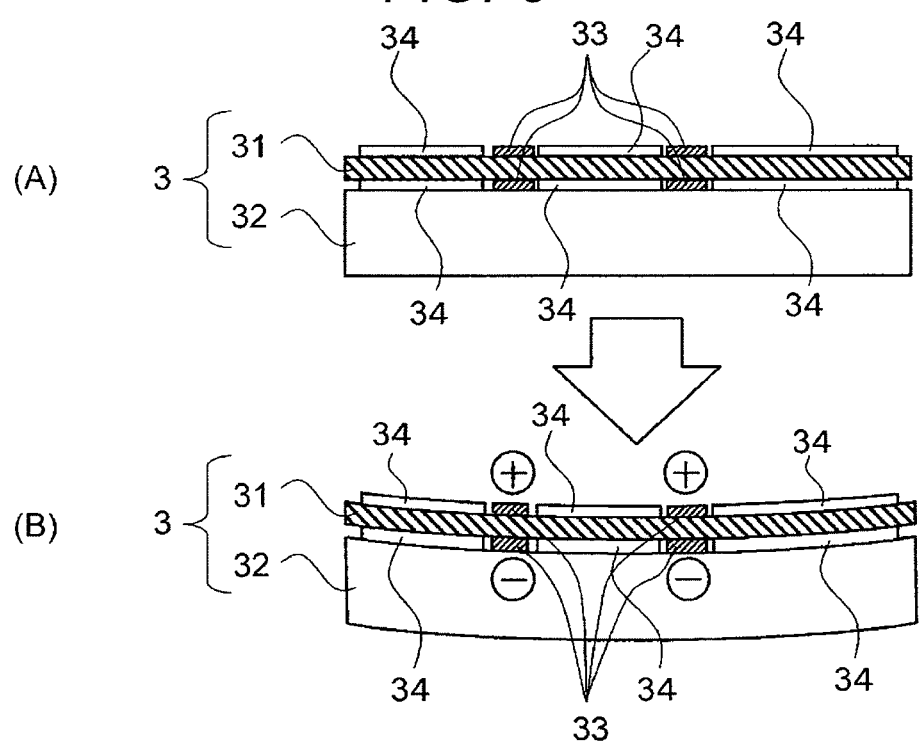
FIG. 8 is a diagram illustrating a configuration of the pressure sensor in the electronic apparatus according to the first exemplary embodiment.

The pressure sensor 3 detects pressing force by using a piezoelectric film 31 which is formed by a piezoelectric element, as illustrated in FIG. 8. The piezoelectric film 31 is disposed on a base plate 32 and a plurality of pressing force detecting electrode patterns 33 are disposed such that the piezoelectric film 31 is interposed between the plurality of pressing force detecting electrode patterns 33, in the pressure sensor 3. Pressure is applied downwardly in a state (A) where the base plate 32 and the like are not bent and then a state (B) where the base plate 32 and the like are bent occurs. If the state (B) occurs, minute bending of the piezoelectric film 31 causes charges to be generated and a voltage is generated between the pressing force detecting electrode patterns 33 which face each other with the piezoelectric film 31 interposed therebetween. The pressure sensor 3 can detect the pressing force based on the voltage.

In the pressure sensor 3 illustrated in FIG. 8, predetermined patterns 34 other than the pressing force detecting electrode patterns 33 are disposed on both surfaces of the piezoelectric film 31. The predetermined patterns 34 may be used similarly to the pressing force detecting electrode pattern 33 and may be used for causing a signal to be transmitted.

In FIG. 6, an example in which the pressure sensor 3 is disposed on the side opposite to the touch panel layer 2 based on the display unit 4 is described. However, as illustrated in FIG. 9, the pressure sensor 3 may be disposed between the display unit 4 and the touch panel layer 2.

Figure 9:
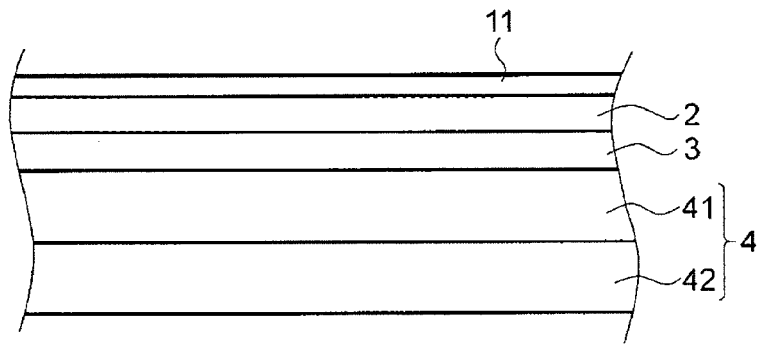
FIG. 9 is a side cross-sectional view illustrating a second arrangement example of the glass, the touch panel layer, the pressure sensor, and the display unit in the electronic apparatus according to the first exemplary embodiment.

In FIG. 9, the glass 11 for protecting the touch panel layer 2 as described above is stacked on the fore surface of the touch panel layer 2. The glass 11 and the touch panel layer 2 have a surface shape and predetermined transmittivity for visible light. Display of the display unit 4 passes through the glass 11 and the touch panel layer 2. At least a portion of the glass 11 is disposed to be exposed by the casing 10 and other portions are disposed on the inside of the casing 10. The glass 11 may be integrally formed with the touch panel layer 2.

In FIG. 9, as described above, the pressure sensor 3 is disposed on the surface reverse to the surface of the touch panel layer 2 on which the glass 11 is stacked. As described above, the LCD 41 and the backlight 42 constituting the display unit 4 are disposed in this order, on the surface reverse to the surface of the pressure sensor 3 on which the touch panel layer 2 is stacked. In this manner, the pressure sensor 3 is disposed on the fore surface side of the display unit 4 and the pressure sensor 3 is transparent and has transmittance referring to a property of transmitting visible light, similarly to the glass 11 and the touch panel layer 2. The pressure sensor 3 may be integrally formed with the touch panel layer 2.

The display unit 4 is disposed in the casing 10 and displays predetermined information based on an instruction of the control unit 6. The display unit 4 includes the liquid crystal display (LCD) 41 and the backlight 42. The display unit 4 may include an organic electroluminescence (EL) device or a device such as an electronic paper, instead of the LCD 41 or the like.

The control unit 6 executes various programs. As one example of the programs, an application program is executed.

The display unit 4 displays a predetermined image (for example, a pointer, an icon, or the like) as display corresponding to a two-dimensional coordinate (x, y) when the two-dimensional coordinate (x, y) determined by the touch panel layer 2 is effective through the application program (not illustrated).

Figure 10:
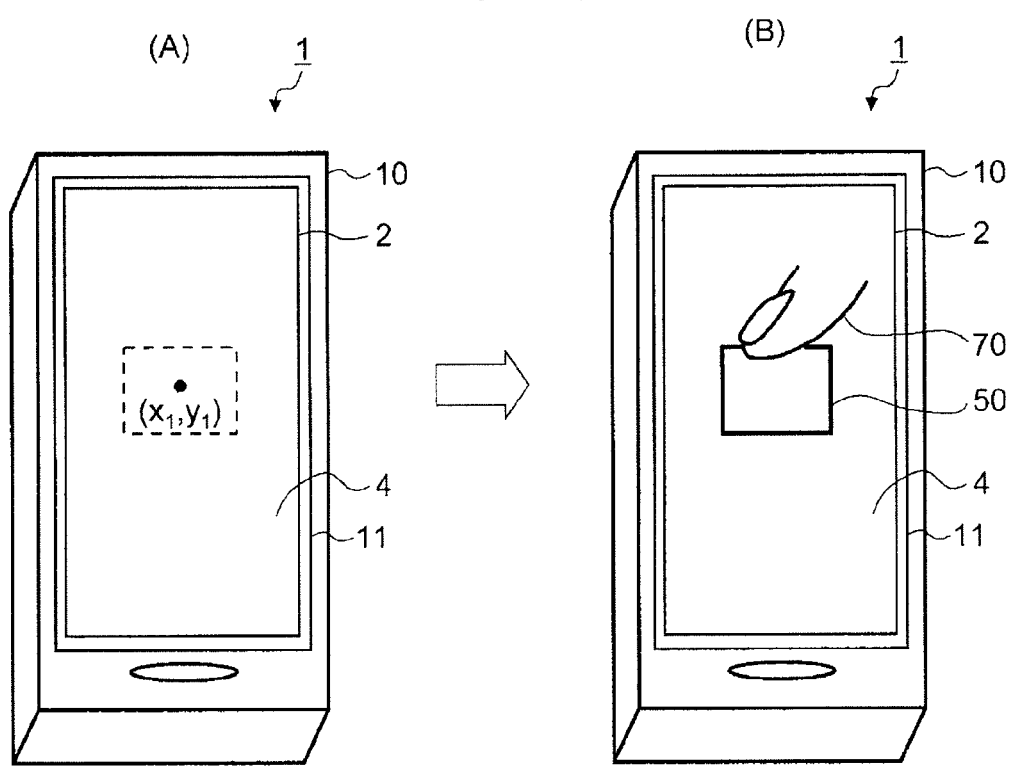
FIG. 10 is a diagram illustrating an example of an icon display operation in the electronic apparatus according to the first exemplary embodiment.

As illustrated in FIG. 10(B), an icon 50 is displayed when the two-dimensional coordinate ($x_1$, $y_1$) is effective through the application program as illustrated in FIG. 10(A). In this case, the effective two-dimensional coordinate ($x_1$, $y_1$) is also not directly displayed, but the two-dimensional coordinate ($x_1$, $y_1$) is displayed in a form of the icon 50 being displayed, that is, may be recognized to be displayed.

Figure 11:
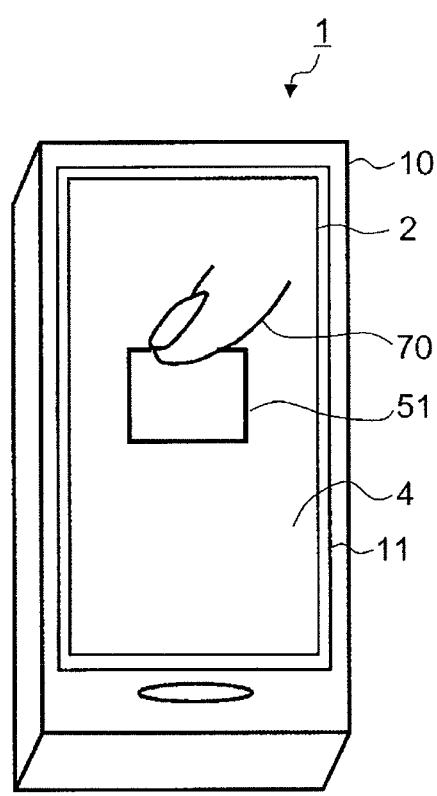
FIG. 11 is a diagram illustrating an example of a long pressing operation in the electronic apparatus according to the first exemplary embodiment.

In FIG. 10(B), a pointer (not illustrated) corresponding to the two-dimensional coordinate (x, y) may be displayed. In this case, the icon 50 may be in a state in which the icon 50 is selectable when the pointer is superposed on the icon 50. Such display of the pointer or icon 50 and an operation of a function corresponding to the icon 50 are performed by an instruction of the control unit 6. The control unit 6 may perform a first operation (normal touch operation) when a finger touches a predetermined area, for example, an area corresponding to an icon 51, an effective coordinate is maintained for a first period (for example, 0.1 seconds), and then the finger is separated from the area, through the application program, similarly to the illustration of FIG. 11. The control unit 6 may perform a second operation (normal long pressing operation) when the predetermined area (second range) is pressed with a finger and an effective coordinate is maintained for at least a second period (the second period is longer than the first period. for example: 0.5 seconds).

Return to the description of FIG. 1. The storage unit 5 includes a volatile memory such as a dynamic random access memory (DRAM) and when a user performs various settings on the electronic apparatus 1, the storage unit 5 stores the performed settings.

The control unit 6 controls each unit of the electronic apparatus 1. The control unit 6 is configured by a central processing unit (CPU), a read only memory (ROM), a random access memory (RAM), and an interface circuit. A program for controlling the CPU is stored in the ROM and the RAM is used as a computation area when the CPU is operated.

The wireless communication unit 7 is connected to an antenna. The wireless communication unit 7 performs wireless transmission and wireless reception with the outside through the antenna and the wireless communication unit 7 transmits or receives data such as a program or receives.

The power source unit 8 is connected to the rechargeable battery 14 such as a lithium ion battery. The power source unit 8 supplies power which is supplied from the rechargeable battery to each unit of the electronic apparatus 1.

In this exemplary embodiment, the control unit 6 performs a coordinate determining process based on input information from the pressure sensor 3 and the touch panel layer 2. The coordinate determining process will be described with reference to FIG. 12, FIG. 13, and FIGS. 14A to 14D.

Figure 12:
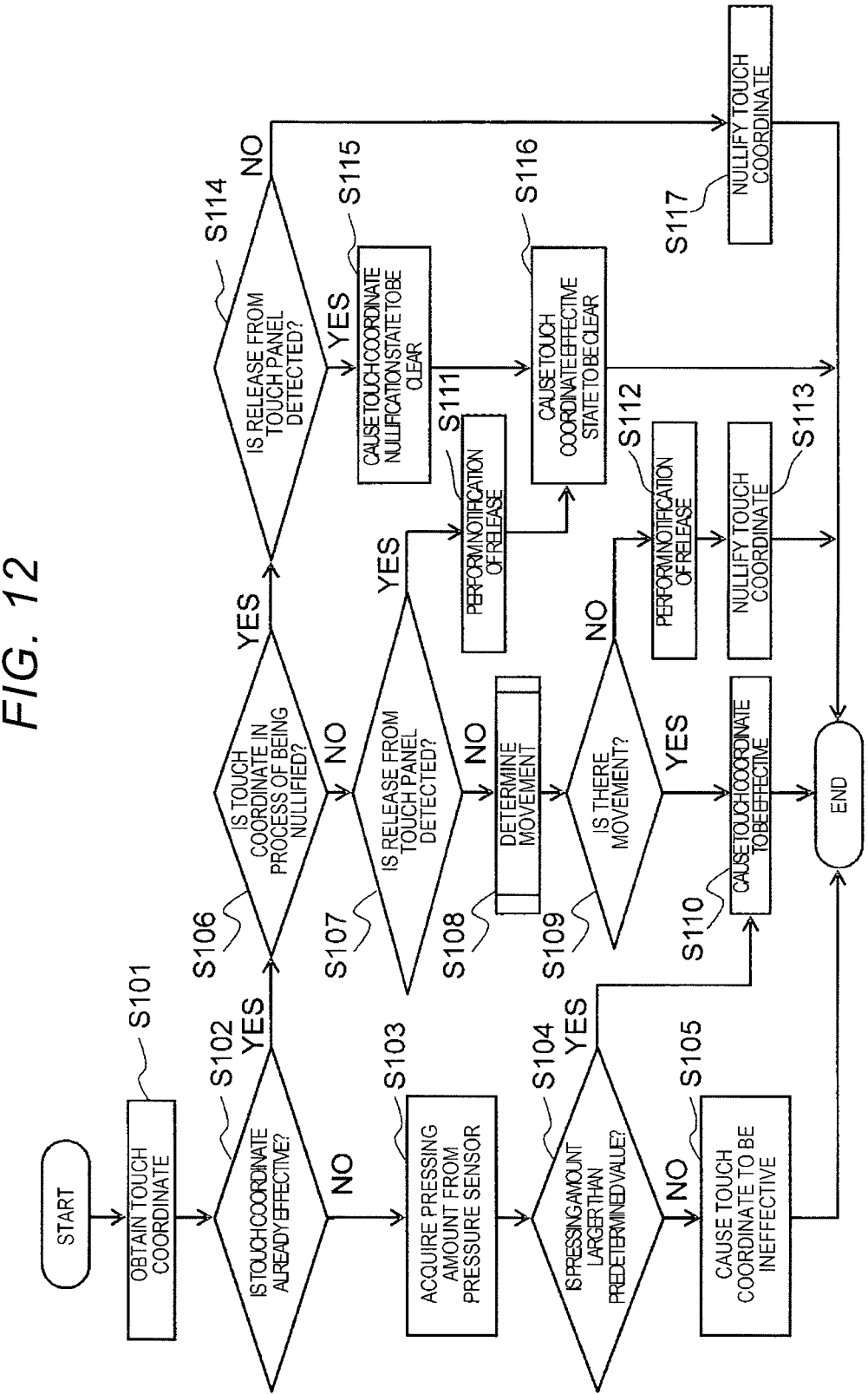
FIG. 12 is a flowchart illustrating a coordinate determining process of the electronic apparatus according to the first exemplary embodiment.

The control unit 6 performs the coordinate determining process illustrated in FIG. 12 periodically (for example, once every 1/60 of a second).

When the coordinate determining process is started, a two-dimensional coordinate (x, y) output by the touch panel layer 2 is obtained as a touch coordinate (x, y) (Step S101). The control unit 6 manages the effectiveness or ineffectiveness of the touch coordinate separately from the obtained touch coordinate (x, y) and holds the effectiveness or ineffectiveness of the touch coordinate at the current time. Before the coordinate determining process is started, the touch coordinate is held to be ineffective.

In Step S102, it is determined whether the touch coordinate is already effective. If the touch coordinate is held to be ineffective before the coordinate determining process is started, it is determined to be NO in Step S102 and a pressing amount is acquired from the pressure sensor 3 (Step S103).

In Step S104, it is determined whether the acquired pressing amount is larger than a predetermined value. When there is no contact of the finger 70 or the gloves 71 and the acquired pressing amount is not larger than the predetermined value (NO in Step S104), the touch coordinate remains ineffective (Step S105) and the process is ended.

In Step S104, when pressure of the finger 70 or the gloves 71 is present and the acquired pressing amount is larger than the predetermined value (YES in Step S104), the touch coordinate is caused to be effective (Step S110) and the process is ended. Since the coordinate determining process is repeated periodically as described above, the control unit 6 repeats to acquire a touch coordinate (x, y) from the touch panel layer 2 (Step S101) again during the next cycle after being ended.

If the touch coordinate is caused to be effective in Step S110, determination in Step S102 is set as YES and the process proceeds to Step S106.

Here, the touch coordinate caused to be effective by the control unit 6 is held to or not to be in the process of being nullified. At first, the effective touch coordinate is held not to be in the process of being nullified.

In Step S106, it is determined whether the touch coordinate is in the process of being nullified. If the touch coordinate is held not to be in the process of being nullified, determination in Step S106 is set as NO and the process proceeds to Step S107.

In Step S107, it is determined whether a perpendicular distance (z) between the finger 70 and the touch panel layer 2 is in a detection region. When the perpendicular distance (z) is in a detection region, release detection is determined not to be performed (NO in Step S107). When the perpendicular distance (z) is out of a detection region, the release detection is determined to be performed (YES in Step S107).

In Step S107, when the release detection is determined not to be performed (NO in Step S107), the process proceeds to Step S108. In Step S108, it is determined whether the touch coordinate (x, y) is changed by the predetermined movement for a predetermined time and the process proceeds to Step S109. The movement determination in Step S108 will be described later with reference to FIG. 13.

In Step S109, when there is predetermined movement (YES in Step S109), the touch coordinate remains effective (Step S110) and the process is ended.

In Step S109, when there is no predetermined movement (NO in Step S109), the control unit 6 notifies the application program of release being performed (Step S112). The effective touch coordinate is nullified (that is, the touch coordinate is caused to be ineffective) and a nullification state is held (Step S113). Then, the process is ended.

The application program may determine that the touch coordinate is ineffective, based on a release notification in Step S112. However, if notification of the application program of the touch coordinate continues even after the application program performs determination, the application program may perform determination of a new touch coordinate. Accordingly, the touch coordinate is actively nullified in Step S113 and thus the application program is not notified of a new touch coordinate.

The control unit 6 nullifies an effective touch coordinate for a time when the nullification state is maintained and thus a touch coordinate for this time substantially becomes ineffective.

Since the coordinate determining process is repeated periodically as described above, the control unit 6 repeats to acquire a touch coordinate (x, from the touch panel layer 2 (Step S101) again during the next cycle after being ended and the process proceeds to Step S102.

In Step S102, when the touch coordinate is effective out of effectiveness or ineffectiveness which is held by the control unit 6 (YES in Step S102), the process proceeds to Step S106. In Step S106, when the touch coordinate is in the process of being nullified (YES in Step S106), the process proceeds to Step S114.

In Step S114, it is determined whether a perpendicular distance (z) between the finger 70 and the touch panel layer 2 is in the detection region, similarly to Step S107. When the perpendicular distance (z) is in a detection region, the release detection is determined not to be performed (NO in Step S114). When the perpendicular distance (z) is out of a detection region, the release detection is determined to be performed (YES in Step S114).

In Step S114, when the release detection is determined not to be performed (NO in Step S114), the control unit 6 causes the effective touch coordinate to be in the process of being nullified and holds the touch coordinate to be in the nullification state (Step S117). Then, the process is ended.

The control unit 6 nullifies an effective touch coordinate for a time when the nullification state is maintained and thus a touch coordinate for this time substantially becomes ineffective.

In Step S114, when the release detection is determined to be performed (YES in Step S114), the process proceeds to Step S115. In Step S114, it is determined whether a perpendicular distance (z) between the finger 70 and the touch panel layer 2 is in the detection region, but a perpendicular distance corresponding to the detection region may be changed in accordance with a design and the perpendicular distance corresponding to the detection region may be set to 0 (zero). In this case, the touch state corresponds to NO in Step S114 and a state changed from the touch state, in which a finger is separated from the touch panel layer 2 corresponds to YES in Step S114.

The control unit 6 causes the held nullification state to be clear in Step S115, and the process proceeds to Step S116.

The effectiveness of the touch coordinate is caused to be clear in Step S116. That is, the held effectiveness of the touch coordinate is caused to be ineffective. Then, the process is ended.

In Step S107, when the release detection is determined to be performed (YES in Step S107), the process proceeds to Step S111. It is determined whether the perpendicular distance (z) between the finger 70 and the touch panel layer 2 is in the detection region, in Step S107. However, the perpendicular distance corresponding to the detection region may be changed in accordance with the design and the perpendicular distance corresponding to the detection region may be set to 0 (zero). In this case, the touch state corresponds to NO in Step S107 and a state changed from the touch state, in which a finger is separated from the touch panel layer 2 corresponds to YES in Step S107.

The application program is notified of release being performed (Step S111) and the touch coordinate is caused to be clear (Step S116). That is, the held effectiveness of the touch coordinate is caused to be ineffective. Then, the process is ended.

Figure 13:
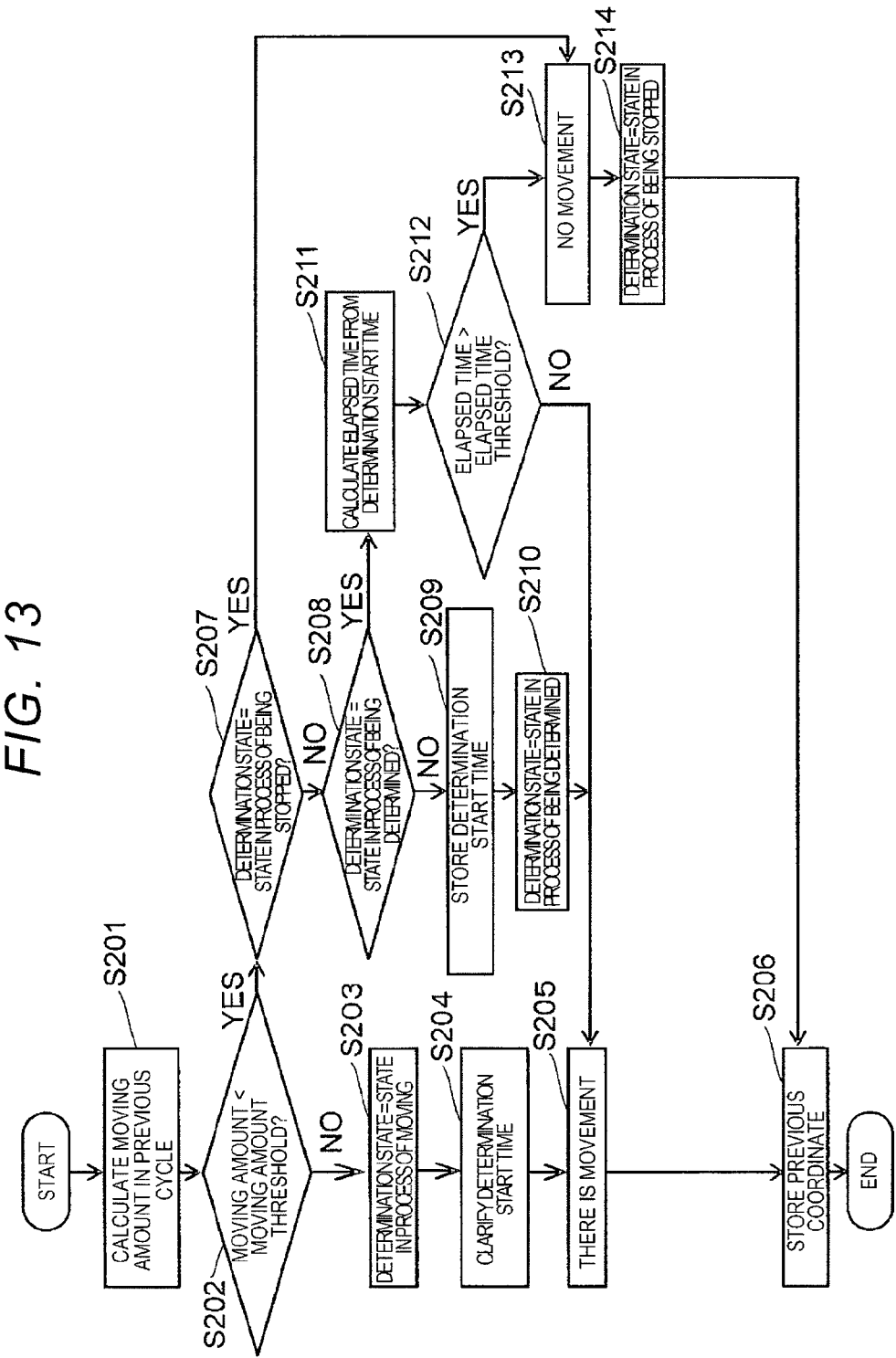
FIG. 13 is a flowchart illustrating a movement determining process of the electronic apparatus according to the first exemplary embodiment.

FIG. 13 is a flowchart illustrating a movement determining process corresponding to Step S108 which is described above. Since the coordinate determining process illustrated in FIG. 12 is repeated periodically (for example, once every 1/60 of a second) as described above, Step S108 which is a part of the coordinate determining process is performed at a period (for example, once every 1/60 of a second) the same as that of the coordinate determining process as an example when Step S108 is performed the most frequently.

The control unit 6 holds the previous coordinate obtained when the movement determining process is performed at the previous cycle, separately from the obtained touch coordinate (x, y). Before the movement determining process is started, the previous coordinate is held as a predetermined coordinate (for example, (0, 0)).

The control unit 6 holds a state as a determination state. The determination state includes three states of a state in the process of moving, a state in the process of being determined, and a state in the process of being stopped. Before the movement determining process is started, the state in the process of moving as the determination state is held.

If the movement determining process is started, the control unit 6 calculates a moving amount based on the previous coordinate (x, y) and the touch coordinate (x, y) at the current time by using a calculation expression illustrated in FIG. 16 (Step S201) and the process proceeds to Step S202.

In Step S202, the control unit 6 determines whether the calculated moving amount is smaller than the predetermined threshold, that is, whether there is movement in a predetermined range (first range). When the moving amount is larger than the predetermined threshold (NO in Step S202), the control unit 6 sets the determination state to be the state in the process of moving (Step S203) and causes an elapsed time when there is no movement to be clear, that is, causes the elapsed time to be 0 (zero) (Step S204).

The control unit 6 determines movement to be present (Step S205), updates the previous coordinate to the touch coordinate at the current time, and stores the updated coordinate (Step S206). Then, the process is ended.

Movement in the first range is a concept including a stopped state with no movement. That is, movement in the first range herein refers to a concept of logical addition of a state where there is no movement and movement in the first range excluding the stopped state.

Movement in the predetermined range for the predetermined time may be determined by using time-differentiation of the x value and/or the y value of the touch coordinate (x, y).

The first range may be the same as the above-described second range.

In Step S202, when the moving amount is smaller than the predetermined threshold (YES in Step S202), the control unit 6 proceeds to the Step S207 and determines whether the determination state is set to be the state in the process of being stopped.

In Step S207, when the determination state is not set to be the state in the process of being stopped, that is, when the determination state is set to be the state in the process of moving or the state in the process of being determined (NO in Step S207), the process proceeds to Step S208 and it is determined whether the determination state is set to be the state in the process of being determined.

In Step S208, when the determination state is not set to be the state in the process of being determined, that is, when the determination state is set to be the state in the process of moving (NO in Step S208), the control unit 6 stores the current time indicated by a timepiece (not illustrated) included in the electronic apparatus, as a determination start time (Step S209). The timepiece is formed by carving an absolute time. The control unit 6 sets the determination state to be the state in the process of being determined (Step S210) and proceeds to Step S205. The control unit 6 sets movement to be present in Step S205. Subsequently, the control unit 6 proceeds from Step S205 to Step S206 as described above and then causes the process to be ended.

In Step S208, when the determination state is set to be the state in the process of being determined (YES in Step S208), the control unit 6 calculates an elapsed time from the determination start time by using a difference between the stored determination start time and the current time indicated by the timepiece (Step S211) and proceeds to Step S212.

In Step S212, the control unit 6 determines whether the elapsed time is longer than predetermined threshold for the elapsed time. When the elapsed time is smaller than the predetermined threshold (NO in Step S212), the control unit 6 proceeds to Step S205 and sets movement to be present. Subsequently, the control unit 6 proceeds from Step S205 to Step S206 as described above and then causes the process to be ended. The predetermined threshold for the elapsed time is set to be a time longer than the second period corresponding to the long pressing operation.

In Step S212, when the elapsed time is longer than the predetermined threshold (YES in Step S212), the control unit 6 sets movement to be absent (Step S213). The control unit 6 sets the determination state to be the state in the process of being stopped (Step S214), and updates the previous coordinate to the touch coordinate at the current time and stores the updated coordinate (Step S206). Then the process is ended.

In Step S207, when the determination state is set to be the state in the process of being stopped (YES in Step S207), the control unit 6 sets movement to be absent (Step S213). The control unit 6 sets the determination state to be the state in the process of being stopped (Step S214), and updates the previous coordinate to the touch coordinate at the current time and stores the updated coordinate (Step S206). Then the process is ended.

The control unit 6 uses a result of setting movement to be present in Step S205 and a result of setting movement to be absent in Step S208 in Step S109 of the coordinate determining process illustrated in FIG. 12.

FIGS. 14A to 14D are schematic diagrams illustrating an example of a series of operations, in which the finger 70 covered with the gloves 71 approaches the glass 11 in a state where there is a water droplet 80 on the glass 11, the finger moves while coming into contact with the glass 11, the finger 70 and the gloves 71 are integrated with the water droplet 80 in a state of the finger coming into contact with the glass 11, and then the finger 70 is separated from the glass 11.

A case where the series of the operation example is applied to the coordinate determining process in FIG. 12 and the movement determining process in FIG. 13 will be described.

Figure 14A:
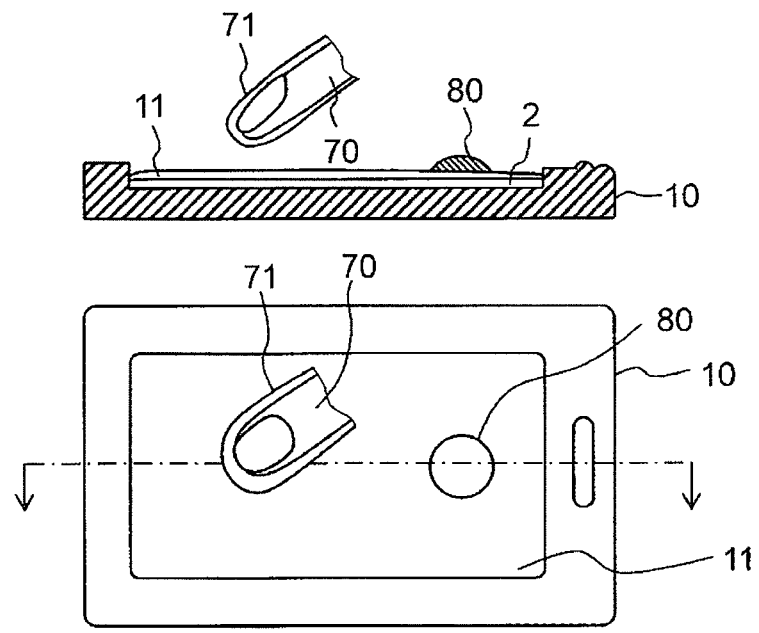
FIG. 14A is a schematic diagram illustrating a first manipulation example in the electronic apparatus according to the first exemplary embodiment.

First, as illustrated in FIG. 14A, the finger 70 approaches the touch panel layer 2 and pushes the detection region in a state where there is the water droplet 80 on the glass 11. The control unit 6 obtains a touch coordinate (Step S101). The control unit 6 determines that the touch coordinate is not effective yet (NO in Step S102) and acquires a pressing amount from the pressure sensor 3 (Step S103). The control unit 6 determines that the pressing amount is smaller than a predetermined value due to the water droplet 80 (NO in Step S104) and causes the touch coordinate to be ineffective (Step S105).

Figure 14B:
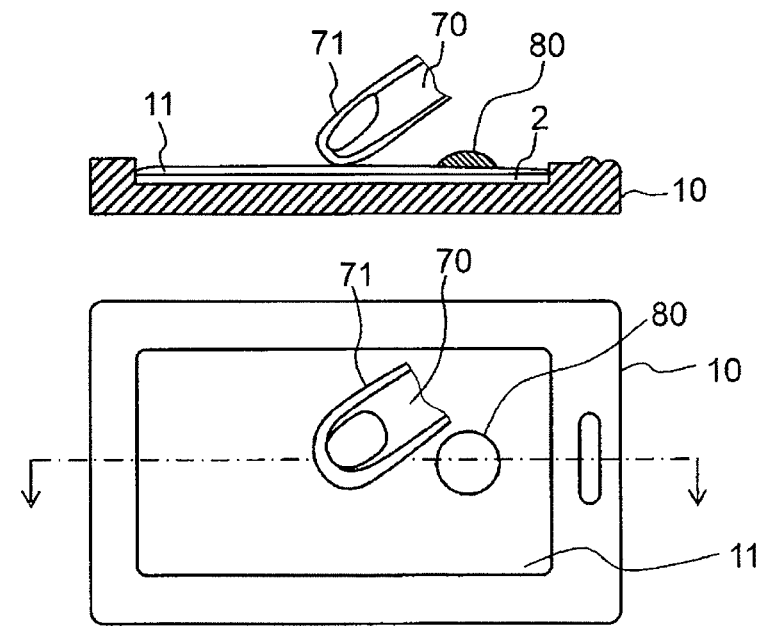
FIG. 14B is a schematic diagram illustrating a second manipulation example in the electronic apparatus according to the first exemplary embodiment.

As illustrated in FIG. 14B, the finger 70 and the gloves 71 come into contact with the glass 11. The control unit 6 obtains a touch coordinate (Step S101). Then control unit 6 determines that the touch coordinate is not effective yet (NO in Step S102) and acquires a pressing amount from the pressure sensor 3 (Step S103). The control unit 6 determines that the pressing amount by the finger 70 is larger than the predetermined value (YES in Step S104) and causes the touch coordinate to be effective (Step S110).

Figure 14C:
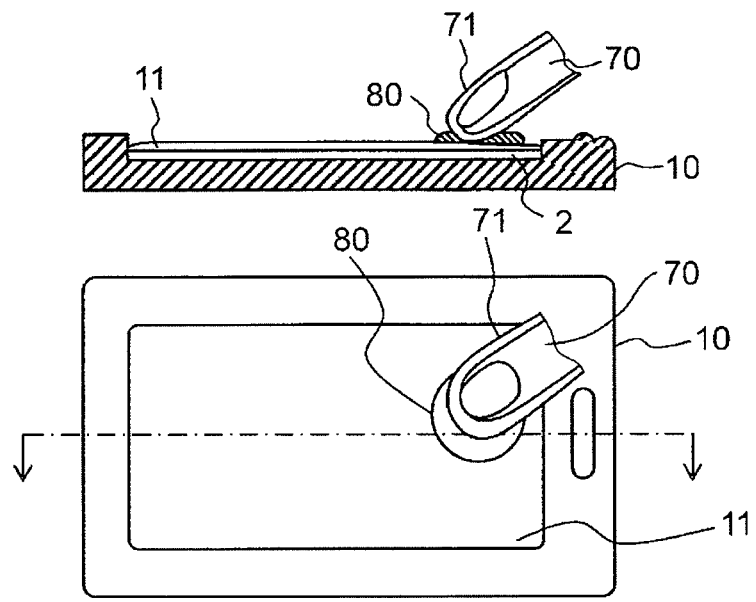
FIG. 14C is a schematic diagram illustrating a third manipulation example in the electronic apparatus according to the first exemplary embodiment.

As illustrated in FIG. 14C, the finger 70 and the gloves 71 come into contact with the glass 11 and move to be integrated with the water droplet 80. The control unit 6 obtains a touch coordinate (Step S101). The control unit 6 determines that the touch coordinate is already effective (YES in Step S102), the touch coordinate is not in the process of being nullified yet (NO in Step S106), release detection is not performed yet (NO in Step S107), and the finger 70 or the like is moving (YES in Step S108 and Step S109). Then, the control unit 6 causes the touch coordinate to be effective (Step S110).

The touch panel layer 2 outputs a touch coordinate sequentially, but if the finger 70 and the gloves 71 are integrated with the water droplet 80, it is not possible to distinguish between the touch coordinate corresponding to the finger 70 and the touch coordinate corresponding to the water droplet 80. For example, when after integration is performed, the finger 70 is separated from the glass 11, the touch coordinate corresponding to the water droplet 80 is also sequentially output as the touch coordinate corresponding to the finger 70. Further, the touch panel layer 2 confuses the water droplet 80 with finger 70 and a state where the release detection is not performed is caused.

Figure 14D:
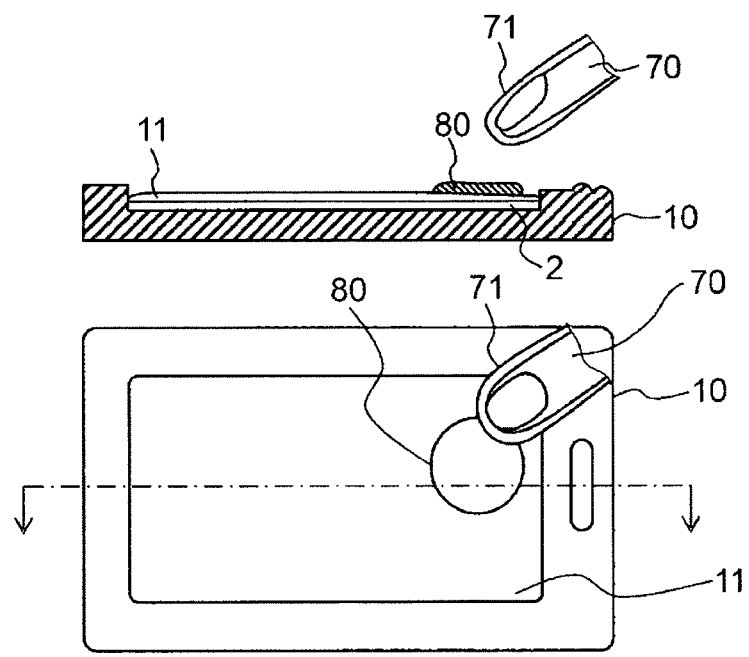
FIG. 14D is a schematic diagram illustrating a fourth manipulation example in the electronic apparatus according to the first exemplary embodiment.

As illustrated in FIG. 14D, the finger 70 and the gloves 71 are separated from the glass 11. The control unit 6 obtains a touch coordinate (Step S101). The control unit 6 determines that the touch coordinate is already effective (YES in Step S102), the touch coordinate is not in the process of being nullified yet (NO in Step S106), and release detection is not performed yet (NO in Step S107) and the control unit 6 performs movement determination (Step S108).

When the water droplet 80 does not move, the control unit 6 starts the movement determination (Step S201, Step S202, Step S207, Step S208, Step S209, Step S210, Step S205, and Step S206) and sets movement to be present until an elapsed time from the start time of the movement determination exceeds the predetermined threshold (Step S201, Step S202, Step S207, Step S208, Step S211, Step S212, Step S205, and Step S206).

In Step S109, the control unit 6 determines movement to be present (YES in Step S109) and causes the touch coordinate to be effective (Step S110).

When the water droplet 80 does not move continuously, the control unit 6 sets movement to be absent until an elapsed time from the start time of the movement determination exceeds the predetermined threshold (Step S201, Step S202, Step S207, Step S208, Step S211, Step S212, Step S213, Step S214, and Step S206).

The application program is notified that movement is determined to be absent (NO in Step S109) in Step S109 and release is performed (Step S112). The effective touch coordinate is nullified (Step S113). That is, the touch coordinate is caused to be ineffective substantially.

Then, nullification (Step S101, Step S102, Step S106, Step S114, and Step S117) of the touch coordinate is repeated until the touch panel layer 2 detects release.

FIG. 14A, FIG. 14B, FIG. 14C, and FIG. 14D illustrate an example in which the finger 70 is covered with the gloves 71, but a case in which the finger 70 is not covered with the gloves 71 may be also applied similarly.

FIG. 15 is a schematic diagram illustrating an operation example in which the operations of the finger 70 or the like is brought into contact with the glass 11, moves, and is separated from the glass 11 illustrated in FIG. 14B, FIG. 14C, and FIG. 14D are performed in a time axis.

In FIG. 15, a transverse axis indicates time and it is assumed that the finger 70 or the like is brought into contact with the glass 11 at time=0 (corresponding to FIG. 14B). As described above, if a pressing amount applied by the finger 70 is larger than the predetermined value, the touch coordinate is caused to be effective. A touch coordinate corresponding to the water droplet 80 which is present prior to contact of the finger 70 or the like is maintained to be ineffective.

For a time when the finger 70 or the like moves (corresponding to a time from a time in FIG. 14B to a time in FIG. 14C). That is, the finger 70 is moving for a time from time=0 to time=a in FIG. 15 and the touch coordinate generated by the finger or the like is caused to be effective.

If the finger 70 or the like is integrated with the water droplet 80 at time=a, a touch coordinate corresponding to the integration is output as an effective coordinate until time=b without the touch coordinate corresponding to the finger 70 and the touch coordinate corresponding to the water droplet 80 being distinguished from one another (corresponding to FIG. 14C).

If the finger 70 or the like is separated from the glass 11 at time=b, a coordinate of the water droplet 80 is output as the effective coordinate until a time when the above-described moving amount is smaller than moving amount threshold is longer than the elapsed time threshold (until time=c).

If the time when the moving amount is smaller than moving amount threshold is longer than the elapsed time threshold (after time=c), as described above, movement is determined to be absent and the effective touch coordinate is nullified, and the touch coordinate is caused to be ineffective. Accordingly, it is possible to end sequential incorrect detection due to the water droplet after time=c.

In the electronic apparatus 1 according to this exemplary embodiment, as described above, a pressing amount is acquired from the pressure sensor 3 (Step S103). When the acquired pressing amount is larger than the predetermined value (YES in Step S104), the touch coordinate is caused to be effective (Step S110). Here, a method of causing a touch coordinate corresponding to the finger 70 or the like to be effective is not limited thereto.

For example, when a distance between an instructing object such as the finger 70 and the touch panel layer 2 is equal to or less than the predetermined distance, a two-dimensional coordinate corresponding to the instructing object may be caused to be effective.

In addition, when the distance between an instructing object such as the finger 70 and the touch panel layer 2 is equal to 0 (zero), a two-dimensional coordinate corresponding to the instructing object may be caused to be effective. The distance between the instructing object and the touch panel layer 2 being 0 (zero) may include a case where an instructing object such as a finger is brought into contact with the glass 11 and the finger is bent.

Similarly to these, when a predetermined condition is satisfied, a two-dimensional coordinate corresponding to the instructing object may be caused to be effective.

In the coordinate determining process of FIG. 12 as described above, some parts of the coordinate determining process may be extracted and performed. For example, Step S101, Step S102, Step S106, Step S107, Step S108, Step S109, Step S110, Step S112, and Step S113 may be extracted and performed.

In this case, when the predetermined condition is satisfied, a two-dimensional coordinate corresponding to the instructing object is caused to be effective. The effective two-dimensional coordinate is changed depending on movement of the instructing object. When the effective two-dimensional coordinate is changed in the predetermined range for the predetermined time, it can be recognized that the effective two-dimensional coordinate is caused to be ineffective.

Similarly, a very small variation of a capacitive value is detected in order to detect a hover operation in the electrostatic capacitive touch panel layer 2. However, a detected variation of the capacitive value when the water droplet 80 is attached to the touch panel layer 2 is approximate to a detected variation of the capacitive value when the hover operation is actually performed on the touch panel layer 2.

Thus, the attachment may be incorrectly detected as performing of the hover operation when a water droplet is attached to the touch panel layer 2 due to rain and the like.

Particularly, in the touch panel layer 2 which may detect such a hover operation, when an instructing object such as a finger approaches the touch panel layer 2 and thus a two-dimensional coordinate is caused to be effective, then the two-dimensional coordinate is changed depending on movement of the instructing object and moves to a location of a water droplet on the touch panel layer 2, and then the instructing object is separated from the touch panel layer 2, it is difficult that the water droplet remaining on the touch panel layer 2 is distinguished from the separated instructing object and thus a two-dimensional coordinate corresponding to the remaining water droplet may be caused to be effective continuously and the next desired operation may or may be not performed. When the effective two-dimensional coordinate is not greatly changed for the predetermined time, that is, when it is highly likely that the effective two-dimensional coordinate is a two-dimensional coordinate corresponding to the remaining water droplet, the two-dimensional coordinate is caused to be ineffective and thus the subsequent desired operation or the like is allowed to be performed through the steps. Such an effect and an advantage are features in the touch panel layer 2 which may detect the hover operation. However, such an effect and an advantage may be also obtained in the touch panel layer 2 which may detect the touch operation. That is, similar effect and advantage are obtained in the touch panel layer 2 which may detect the touch operation and the touch panel layer 2 which may detect both of the hover operation and the touch operation.

Since the first period for causing a two-dimensional coordinate to be ineffective is longer than the second period corresponding to a predetermined operation (for example, an operation corresponding to long pressing) in the electronic apparatus 1 according to this exemplary embodiment, it is possible to perform a predetermined operation as necessary. When the effective two-dimensional coordinate is not greatly changed for the predetermined time, that is, when it is highly likely that the effective two-dimensional coordinate is a two-dimensional coordinate corresponding to the remaining water droplet, the two-dimensional coordinate is caused to be ineffective and thus the subsequent desired operation or the like is allowed to be performed.

The electronic apparatus 1 according to this exemplary embodiment may include a portable wireless device, a game console, a television, a microwave oven, a washing machine, a refrigerator, a car navigation, a car including the car navigation, a home energy management system (HEMS) terminal device, a house including the a home energy management system (HEMS) terminal device, an automated teller machine (ATM), a digital signage system, and the like.

In the electronic apparatus 1 according to this exemplary embodiment, a program describing processing of a control method illustrated in the flowcharts of FIG. 12 and FIG. 13 is stored in the ROM. However, the program may be stored in a storage medium such as a magnetic disk, an optical disk, a magneto-optical disk, a flash memory and be distributed.

Figure 17:
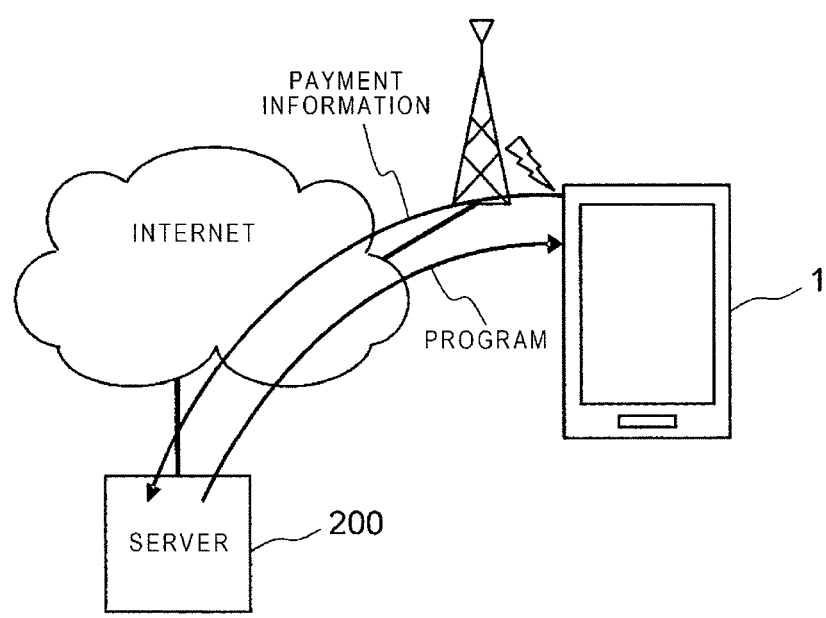
FIG. 17 is a schematic diagram illustrating a download system according to the first exemplary embodiment.

Similarly to illustration of FIG. 17, the program may be stored in a server 200 over a network such as the Internet and be downloaded by using an electric telecommunication line. Payment information marked on a credit card or the like may be transmitted from the electronic apparatus 1 (for example, smartphone) and the like to the server 200 in order to pay price (cost) as a value for the program, the payment may be performed, and the program may be transmitted (downloaded).

The program downloaded in this manner may be installed on and executed in the electronic apparatus 1, that is, the program may be executable.

Second Exemplary Embodiment

Hereinafter, a second exemplary embodiment according to the present invention will be described with reference to the drawings.

Figure 18:
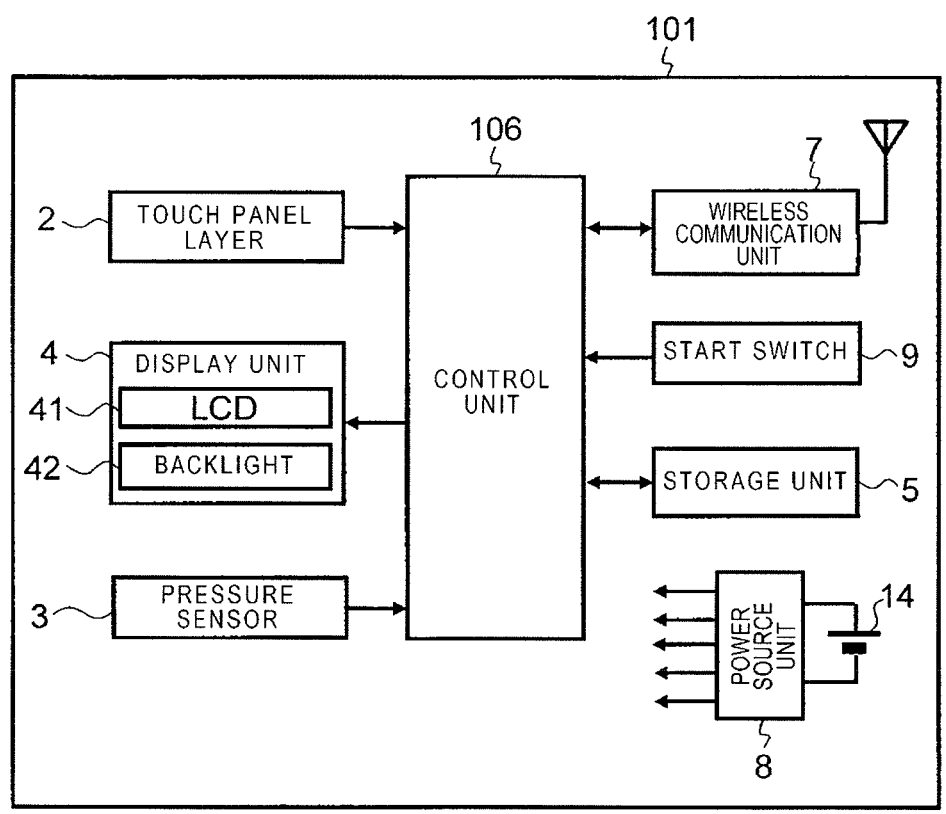
FIG. 18 is a block diagram illustrating an example of a schematic configuration of an electronic apparatus according to a second exemplary embodiment.

FIG. 18 is a block diagram illustrating an example of a schematic configuration of an electronic apparatus 101 according to this exemplary embodiment.

In FIG. 18, the electronic apparatus 101 has the same configuration as that of the electronic apparatus 1 according to the first exemplary embodiment except for a start switch 9 and a control unit 106.

Figure 19:
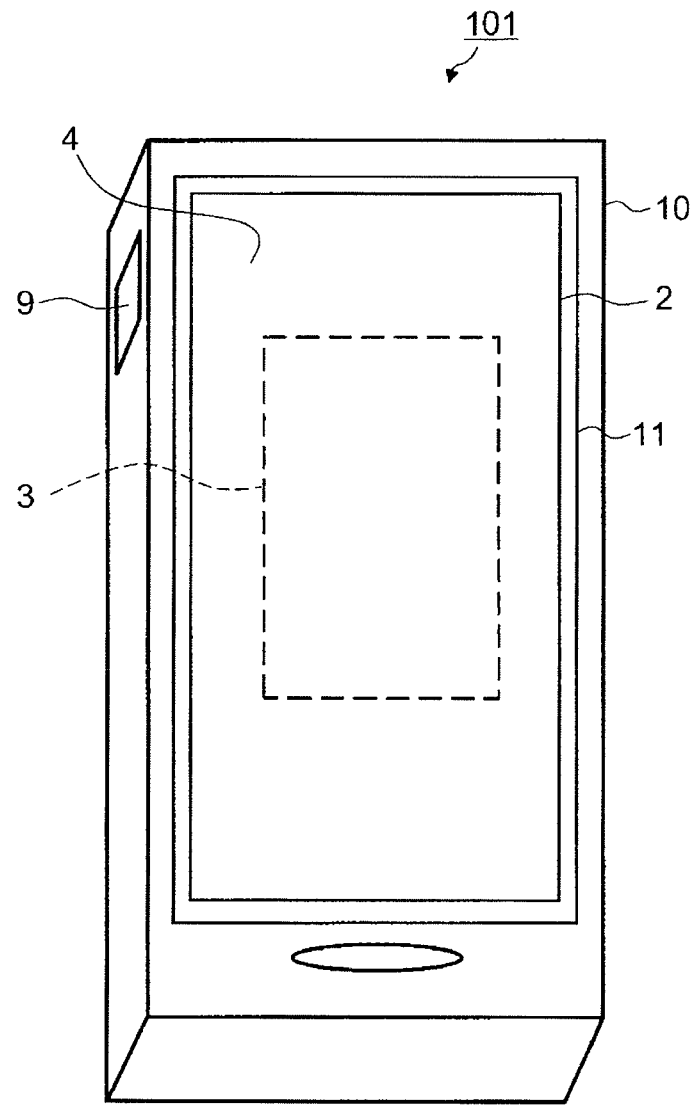
FIG. 19 is a perspective view illustrating an example of an appearance of a fore surface of the electronic apparatus according to the second exemplary embodiment.

The start switch 9 is disposed on a side surface of the casing 10 and is operatable by a user of the electronic apparatus 101 from the outside thereof, as illustrated in FIG. 19.

Figure 20:
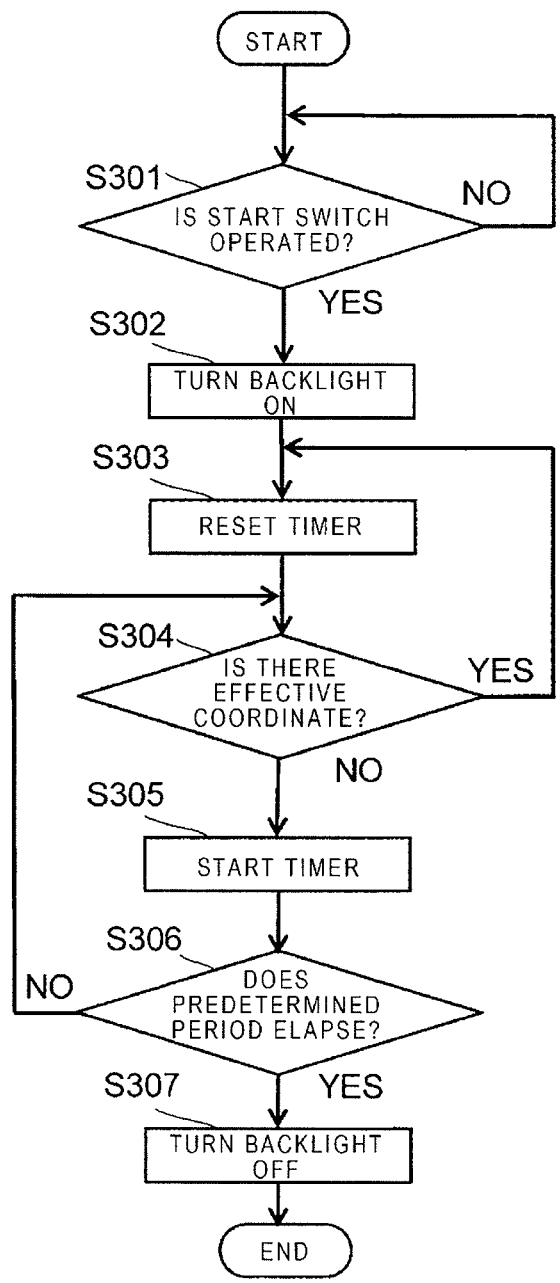
FIG. 20 is a flowchart illustrating a display unit turning-off process of the electronic apparatus according to the second exemplary embodiment.

The control unit 106 performs the coordinate determining process and the movement determining process, similarly to the control unit 6 of the first exemplary embodiment, and performs a display unit turning-off process illustrated in FIG. 20.

The electronic apparatus 101 according to this exemplary embodiment causes an effective two-dimensional coordinate to be ineffective when the effective two-dimensional coordinate is changed in the predetermined range for the predetermined time, similarly to the electronic apparatus 1 according to the first exemplary embodiment. Then, after a predetermined time (third period) elapses, the electronic apparatus 101 turns the display unit off. FIG. 20 is a flowchart relating to a process of display unit turning-off.

If the process of display unit turning-off illustrated in FIG. 20 is started, the control unit 106 determines whether the start switch 9 is operated (Step S301). When the start switch 9 is not operated (NO in Step S301), the control unit 106 repeats Step S301. When the start switch 9 is operated (YES in Step S301), the control unit 106 turns the backlight 42 on (Step S302).

The control unit 106 includes a timer (not illustrated) and resets the timer to allow the timer to calculate a time after the next start is performed.

The control unit 106 resets the timer in the next Step S303 and proceeds to Step S304. The control unit 106 determines whether there is an effective coordinate (Step S304). For example, when a touch coordinate is effective in Step S110 of FIG. 12 and the like, the control unit 106 determines that there is the effective coordinate (YES in Step S304) and returns to Step S303.

In Step S304, for example, when a touch coordinate is ineffective in Step S112 and Step S113 of FIG. 12 and the like, the control unit 106 determines the effective coordinate to be ineffective (NO in Step S304) and proceeds to Step S305.

The control unit 106 causes the timer to be started in Step S305 and proceeds to Step S306.

When Step S305 is performed for the first time after the timer is reset in Step S303, as described above, the control unit 106 causes the timer to be started. However, when Step S305 is performed from the second time on and after the timer is reset (for example, when No in Step S304, Step S305, and Step S306 is repeated), the control unit 106 performs no operation particularly in Step S305 and the timer calculates the time continuously.

In Step S306, the control unit 106 determines whether the predetermined time (third period, for example, 15 seconds) elapses, based on the time calculated by the timer. When the predetermined time does not elapse (NO in Step S306), the control unit 106 returns to Step S304. When the predetermined time elapses (YES in Step S306), the control unit 106 turns the backlight 42 off (Step S307) and ends the process.

Figure 21:
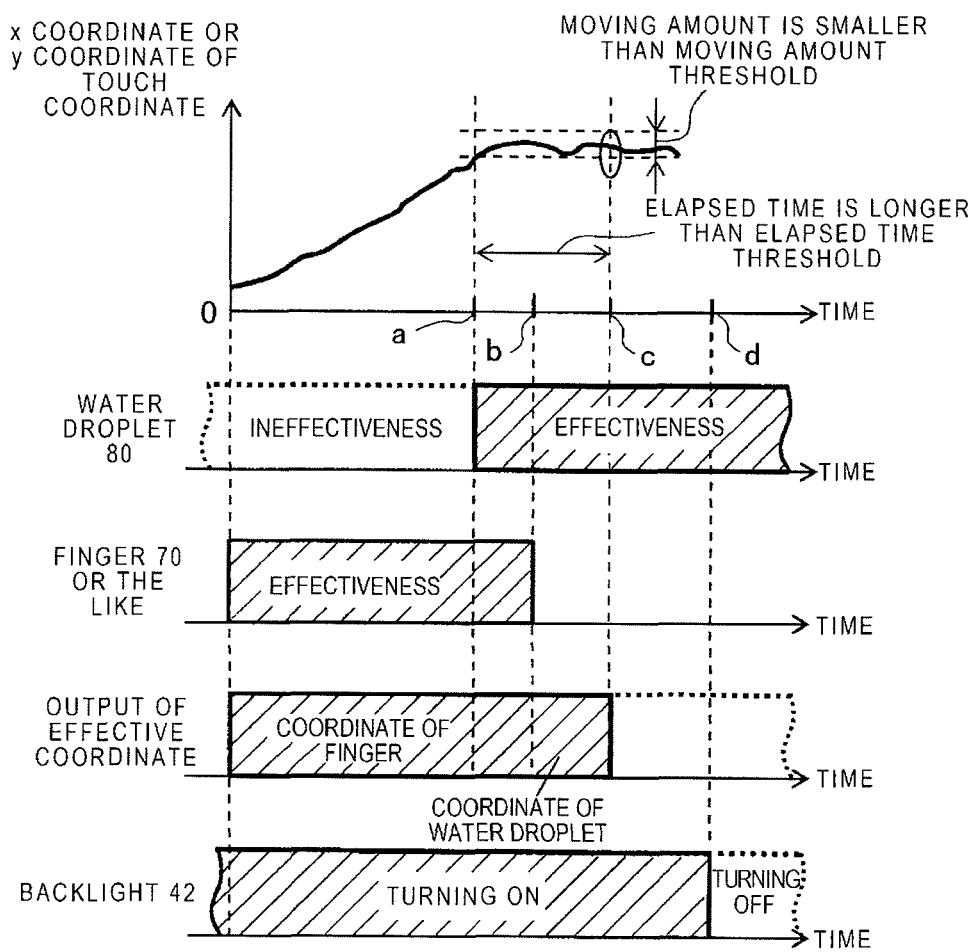
FIG. 21 is a schematic diagram illustrating an operation example of contact, movement, and separation of a finger or the like and turning-off of the display unit in the electronic apparatus according to the second exemplary embodiment.

FIG. 21 is a schematic diagram illustrating an operation example in which the operations of the finger 70 or the like is brought into contact with the glass 11, moves, and is separated from the glass 11 illustrated in FIG. 14B, FIG. 14C, and FIG. 14D are performed in a time axis, similarly to FIG. 15. Additionally, FIG. 21 illustrates operations of turning on and turning off of the backlight 42 in the same time axis.

In FIG. 21, a transverse axis indicates time and it is assumed that the finger 70 or the like is brought into contact with the glass 11 at a time of 0 (corresponding to FIG. 14B), similarly to in FIG. 15. The backlight 42 is on by an operation of the start switch 9 or the like prior to time=0 (Step S301 and Step S302).

Description of a time from time=0 to time=c is similar to the description of FIG. 15. The control unit 106 outputs an effective coordinate and repeats YES in Step S304 and Step S303 for the time from time=0 to time=c.

In the flowchart of the display unit turning-off process in FIG. 20, if the time when the moving amount is smaller than moving amount threshold is longer than the elapsed time threshold (first period) (time=c), as described above, movement is determined to be absent, the effective touch coordinate is nullified, and the touch coordinate is caused to be ineffective substantially. Accordingly, it is determined to be NO in Step S304 and the timer is started (Step S305, time=c). Then, if the predetermined time (third period) elapses (YES in Step S306), the backlight 42 is turned off (Step S307, time=d).

Accordingly, when the effective two-dimensional coordinate is not greatly changed for the predetermined time (first period), that is, when it is highly likely that the effective two-dimensional coordinate is a two-dimensional coordinate corresponding to the remaining water droplet, the backlight 42 is turned off and thus it is possible to suppress continuous turning on of the backlight 42 due to the remaining water droplet. Thus, it is possible to lengthen a time for performing an operation continuously by the rechargeable battery 14, that is, the time limit of the battery.

As described above, when the effective two-dimensional coordinate is not greatly changed for the predetermined time (first period), that is, when it is highly likely that the effective two-dimensional coordinate is a two-dimensional coordinate corresponding to the remaining water droplet, the predetermined time (third period) elapses and then the backlight 42 is turned off. However, if the third period is too short, the backlight 42 is turned off quickly and thus a user of the electronic apparatus may feel strange. Thus, the third period may be set to be longer than the first period, for example.

A configuration in which a plurality of choices is prepared as the third period in the electronic apparatus 101 and a user can perform selection may be made. All or at least one of the plurality of choices may be set to be longer than the first period as the third period.

A case where the start switch 9 is operated is used as a condition (first condition) for turning the backlight 42 on in the display unit turning-off process of FIG. 20. However, the condition is not limited to the case. For example, a case where a touch coordinate is caused to be effective in Step S110 of FIG. 12 may be used as the first condition. In addition, when a distance between an instructing object such as the finger 70 and the touch panel layer is equal to or less than a predetermined distance, a two-dimensional coordinate corresponding to the instructing object may be caused to be effective and the backlight 42 may be turned on.

When a self-luminous organic EL is used as the display unit 4 instead of the LCD 41 which is combined with the backlight 42 and used, start or stop of luminescence in the organic EL may be controlled instead of turning on or turning off of the backlight 42. The self-luminous display unit 4 is not limited to an organic EL and a plasma display unit 4 may be applied similarly.

If turning on and turning off of the backlight 42 or start and stop of luminescence are included regarding the display unit 4, it is possible to recognize these states as turning on or turning off of the display unit 4.

Hitherto, descriptions are made using a word referred to as turning-off, but turning-off herein does not indicate only a state where the backlight 42 and the like is turned off completely. Turning-off described herein is a concept including a state in which brightness is reduced a little from a state of being on and a state where brightness is reduced significantly from the state of being on.

The present invention may be used in an electronic apparatus in which a touch panel is mounted, a control method of the electronic apparatus, a program of allowing the control method to be performed by installing the program in the electronic apparatus, and a server which stores the program to be downloadable.

What is claimed is:

1. An electronic apparatus, comprising:
   a display configured to display a content;
   a touch panel being electrostatic capacitive, overlapping the display, and configured to determine a two-dimensional coordinate corresponding to an object which has conductivity;
   a transparent member overlapping the touch panel; and
   a sensor configured to detect pressure on the transparent member,
   wherein the touch panel is further configured to detect a hover operation of the object above the touch panel, a distance between the transparent member and the object in the hover operation being more than zero and less than a first distance,
   when the touch panel detects the hover operation of the object, and an amount of the pressure on the transparent member is larger than a predetermined value, the two-dimensional coordinate determined by the touch panel is effective,
   while the two-dimensional coordinate is effective, when the two-dimensional coordinate moves more than a predetermined threshold during repeating time periods, the two-dimensional coordinate is continuously effective,
   while the two-dimensional coordinate is continuously effective, when the two-dimensional coordinate moves less than the predetermined threshold during one of the repeating time periods, the two-dimensional coordinate becomes ineffective, and
   when the touch panel detects the hover operation of the object, and the amount of the pressure on the transparent member is not larger than the predetermined value, the two-dimensional coordinate determined by the touch panel is ineffective.

2. The electronic apparatus according to claim 1, wherein while the two-dimensional coordinate is effective, when the two-dimensional coordinate moves more than the predetermined threshold during the repeating time periods, regardless of whether the amount of the pressure on the transparent member is larger than the predetermined value, the two-dimensional coordinate is continuously effective, and while the two-dimensional coordinate is continuously effective, when the two-dimensional coordinate moves for less than the predetermined threshold during the one of the repeating time periods, regardless of whether the amount of the pressure on the transparent member is larger than the predetermined value, the two-dimensional coordinate becomes ineffective.

3. The electronic apparatus according to claim 1, wherein the sensor detects the pressure on the transparent member by determining whether distortion of the transparent member is present based on a voltage.

4. The electronic apparatus according to claim 1, wherein the transparent member is integrally formed with the touch panel.

5. The electronic apparatus according to claim 1, wherein the sensor comprises a pressure sensor.

6. The electronic apparatus according to claim 5, wherein the pressure sensor comprises a piezo-electric film.

7. The electronic apparatus according to claim 5, wherein the display has a first surface and a second surface opposing the first surface, the content is displayed on the first surface, and the pressure sensor is disposed on the second surface of the display.

8. The electronic apparatus according to claim 5, wherein the pressure sensor is disposed between the touch panel and the display.

9. The electronic apparatus according to claim 1, wherein the touch panel is located between the transparent member and the display.

10. The electronic apparatus according to claim 1, wherein the object is a finger of a user.

11. The electronic apparatus according to claim 1, wherein while the two-dimensional coordinate is effective, the two-dimensional coordinate is displayed on the display.

12. The electronic apparatus according to claim 1, wherein while the two-dimensional coordinate is ineffective, the two-dimensional coordinate is not displayed on the display.

* * * * *